(12) United States Patent
Shin et al.

(10) Patent No.: US 11,989,690 B2
(45) Date of Patent: *May 21, 2024

(54) ELECTRONIC DEVICE AND METHOD OF CONTROLLING ELECTRONIC DEVICE

(71) Applicant: SAMSUNG ELECTRONICS CO., LTD., Suwon-so (KR)

(72) Inventors: Minkyu Shin, Suwon-si (KR); Sangyoon Kim, Suwon-si (KR); Dokyun Lee, Suwon-si (KR); Changwoo Han, Suwon-si (KR); Jonguk Yoo, Suwon-si (KR); Jaewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,024

(22) Filed: Dec. 19, 2022

(65) Prior Publication Data

US 2023/0120040 A1 Apr. 20, 2023

Related U.S. Application Data

(63) Continuation of application No. 17/278,977, filed as application No. PCT/KR2019/013356 on Oct. 11, 2019, now Pat. No. 11,531,455.

(30) Foreign Application Priority Data

Oct. 18, 2018 (KR) .................. 10-2018-0124249
Oct. 2, 2019 (KR) .................. 10-2019-0122061

(51) Int. Cl.
*G06Q 10/087* (2023.01)
*G06F 3/04842* (2022.01)
(Continued)

(52) U.S. Cl.
CPC ....... *G06Q 10/087* (2013.01); *G06F 3/04842* (2013.01); *G06F 3/04883* (2013.01);
(Continued)

(58) Field of Classification Search
CPC .............. G06Q 10/087; G06F 3/04842; G06F 3/04883; G06F 3/167; G06V 10/764;
(Continued)

(56) References Cited

U.S. PATENT DOCUMENTS 9,467,848 B1 10/2016 Song et al.
9,476,848 B1 * 10/2016 Hofmann ............. G01R 33/307
(Continued)

FOREIGN PATENT DOCUMENTS

CN 108665890 A 10/2018
EP 3 343 473 A1 7/2018
(Continued)

OTHER PUBLICATIONS

Communication dated Oct. 8, 2021 by the European Patent Office in counterpart European Patent Application No. 19872657.2.
(Continued)

*Primary Examiner* — Cao H Nguyen
(74) *Attorney, Agent, or Firm* — Sughrue Mion, PLLC

(57) ABSTRACT

Provided are an electronic device capable of providing text information corresponding to a user voice through a user interface and a method of controlling the electronic device. Specifically, an electronic device according to the present disclosure, when an image including at least one object is obtained, analyzes the image to identify the at least one object included in the image, and when a user voice is received, performs voice recognition on the user voice to obtain text information corresponding to the user voice, then identifies an object corresponding to the user voice among the at least one object included in the image, and displays a
(Continued)

memo user interface (UI) including text information on an area corresponding to the object identified as corresponding to the user voice among areas on a display.

17 Claims, 30 Drawing Sheets

(51) Int. Cl.
  *G06F 3/04883* (2022.01)
  *G06V 10/764* (2022.01)
  *G06V 20/10* (2022.01)
  *G10L 15/26* (2006.01)
(52) U.S. Cl.
  CPC ............ *G06V 10/764* (2022.01); *G06V 20/10* (2022.01); *G10L 15/26* (2013.01)
(58) Field of Classification Search
  CPC ......... G06V 20/10; G10L 15/26; G10L 15/22; G10L 2015/221; G06N 3/08
  See application file for complete search history.

(56) References Cited

U.S. PATENT DOCUMENTS

| | | | |
|---|---|---|---|
| 10,224,007 B2 | 3/2019 | Lee et al. | |
| 10,261,686 B2* | 4/2019 | Kim | G06F 3/04817 |
| 10,586,535 B2 | 3/2020 | Kudurshian et al. | |
| 10,847,152 B2 | 11/2020 | Oh et al. | |
| 2003/0182122 A1* | 9/2003 | Horinaka | G06N 3/008 |
| | | | 704/E15.04 |
| 2008/0114603 A1 | 5/2008 | Desrochers | |
| 2012/0260176 A1 | 10/2012 | Sehrer | |
| 2014/0278438 A1* | 9/2014 | Hart | G06F 3/167 |
| | | | 704/275 |
| 2015/0186351 A1* | 7/2015 | Hicks | G06F 3/0482 |
| | | | 715/232 |
| 2016/0077793 A1 | 3/2016 | Disano et al. | |
| 2016/0124564 A1 | 5/2016 | Huang | |
| 2018/0187943 A1 | 7/2018 | Woo et al. | |
| 2018/0187969 A1* | 7/2018 | Kim | G06F 3/04883 |
| 2018/0286401 A1 | 10/2018 | Oh et al. | |
| 2019/0052753 A1 | 2/2019 | Kim et al. | |

FOREIGN PATENT DOCUMENTS

| | | |
|---|---|---|
| JP | 2015-41243 A | 3/2015 |
| JP | 2016-33831 A | 3/2016 |
| KR | 10-2009-0084212 A | 8/2009 |
| KR | 10-2015-0095041 A | 8/2015 |
| KR | 10-2016-0072639 A | 6/2016 |
| KR | 10-1631754 B1 | 6/2016 |
| KR | 10-2017-0100309 A | 9/2017 |
| KR | 10-2018-0080107 A | 7/2018 |
| KR | 10-2018-0080109 A | 7/2018 |

OTHER PUBLICATIONS

International Search Report dated Jan. 20, 2020 issued by the International Searching Authority in counterpart International Application No. PCT/KR2019/013356 (PCT/ISA/210).
International Written Opinion dated Jan. 20, 2020 issued by the International Searching Authority in counterpart International Application No. PCT/KR2019/013356 (PCT/ISA/237).
Non-Final Office Action dated Mar. 2, 2022 in parent U.S. Appl. No. 17/278,977.
Notice of Allowance dated Aug. 10, 2022 in parent U.S. Appl. No. 17/278,977.
Communication dated Feb. 20, 2023 by the European Patent Office in counterpart European Patent Application No. 19872657.2.
Office Action dated Oct. 25, 2023, issued by Chinese Patent Office in Chinese Patent Application No. 201980068526.4.

* cited by examiner

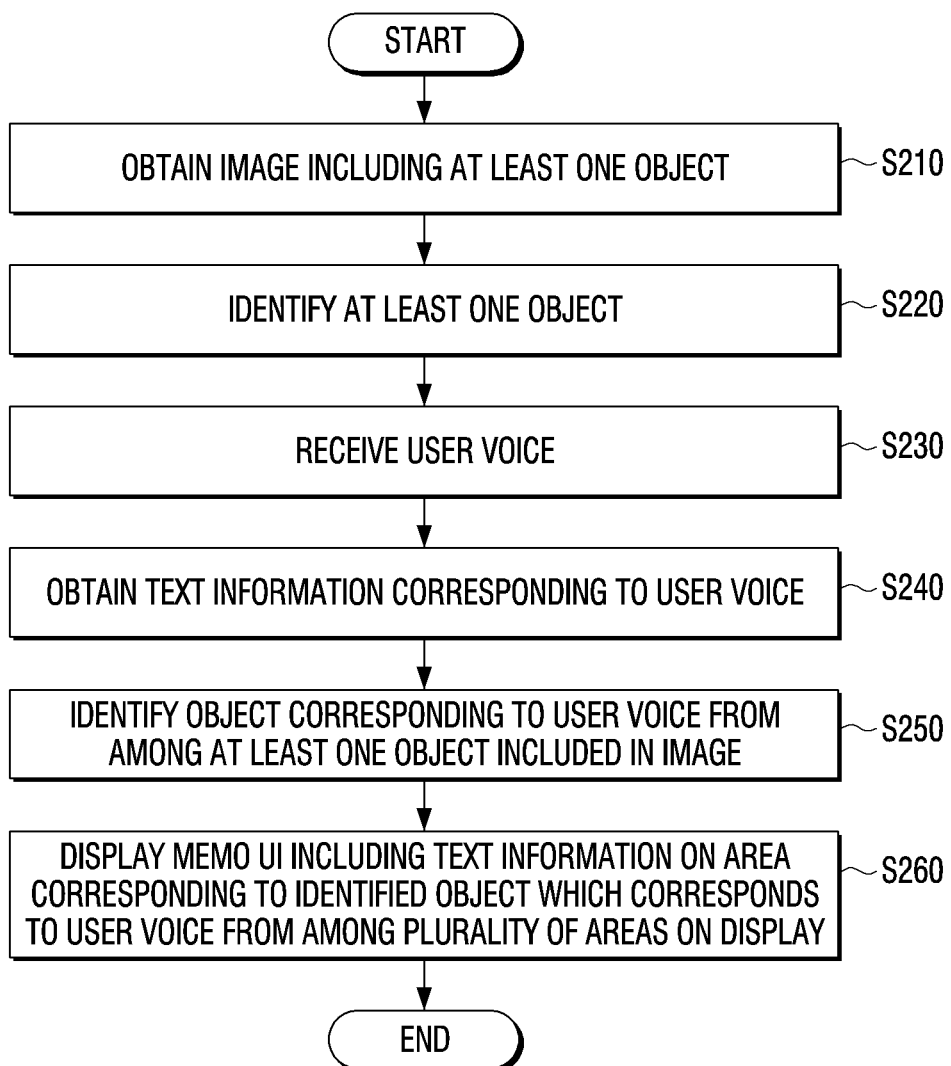

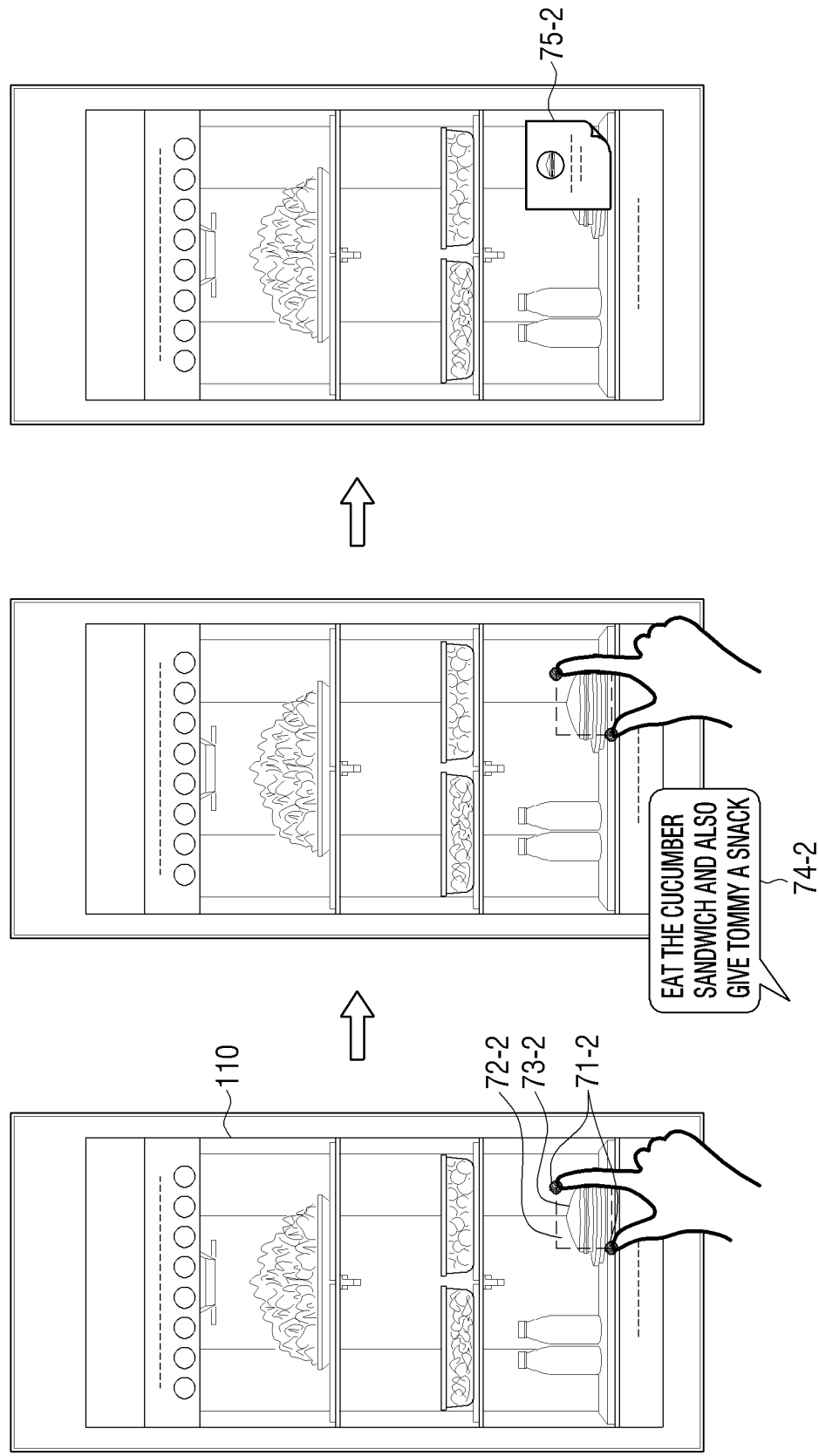

FIG. 11A
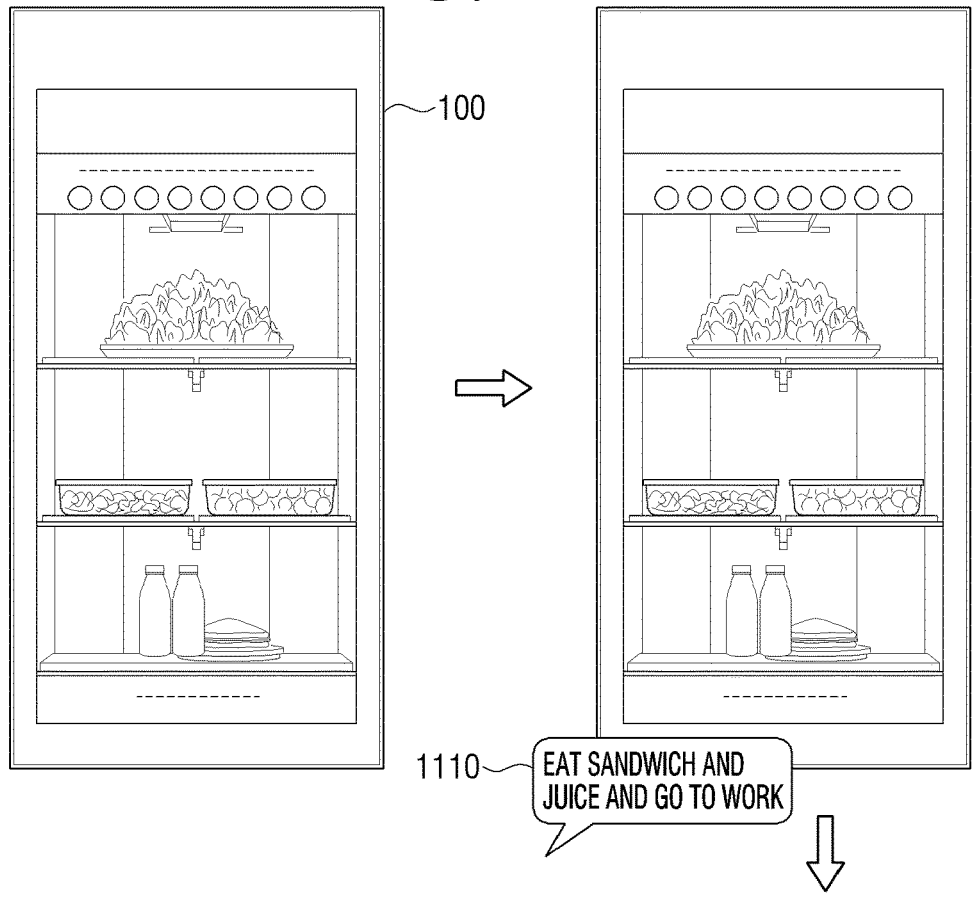
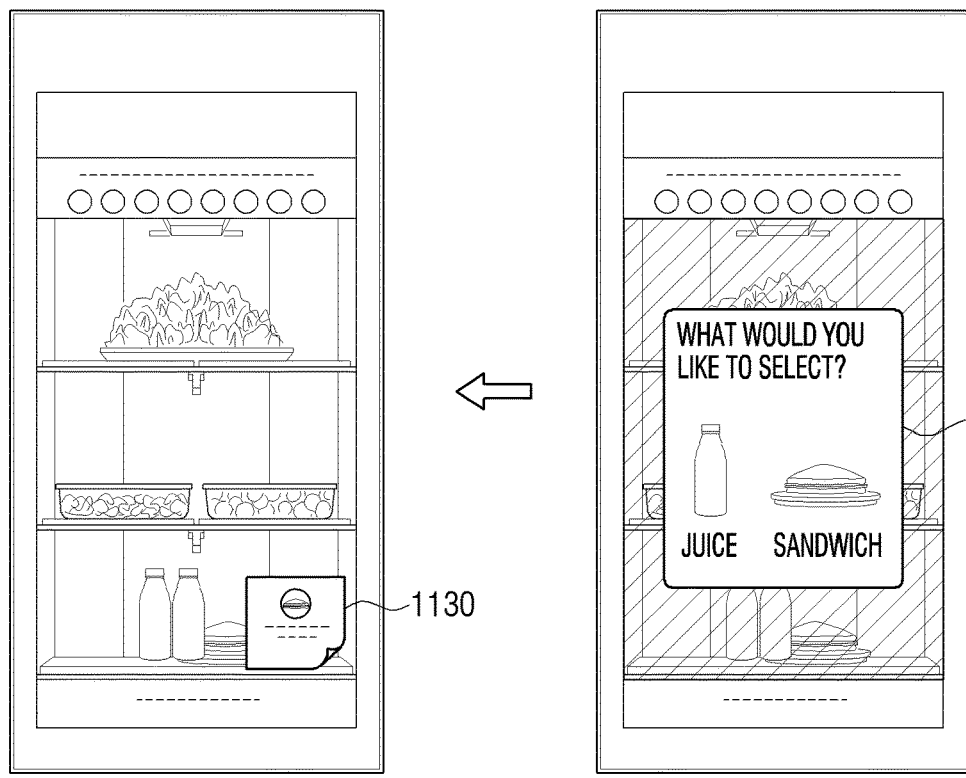

ELECTRONIC DEVICE AND METHOD OF CONTROLLING ELECTRONIC DEVICE

CROSS-REFERENCE TO RELATED APPLICATION(S)

This application is a continuation of U.S. application Ser. No. 17/278,977 filed on Mar. 23, 2021, which is a 371 National Stage of International Application No. PCT/KR2019/013356 filed on Oct. 11, 2019, in the Korean Intellectual Property Receiving Office, which is based on and claims priority to Korean Application No. 10-2018-0124249 filed Oct. 18, 2018 and Korean Application No. 10-2019-0122061 filed Oct. 2, 2019, filed in the Korean Intellectual Property Office, the disclosures of which are incorporated herein by reference in their entireties.

TECHNICAL FIELD

The disclosure relates to an electronic device and a method of controlling an electronic device. More particularly, the disclosure relates to an electronic device capable of providing text information corresponding to a user voice through a user interface and a controlling method thereof.

BACKGROUND ART

Recently, as technology using voice recognition is applied to electronic devices of various types, a user is able to generate text information by uttering the user voice and display the generated text information on a display without having to directly input the text information.

However, according to related art, in order for a user of an electronic device to generate text information in the electronic device by using voice recognition and display at an area on the display desired by the user, there is the disadvantage of having to endure the inconvenience of performing a number of steps such as, for example, and without limitation, executing an application for generating text information, inputting a trigger input for voice recognition, uttering the user voice corresponding to the text information, designating a position at which the text information is to be displayed, designating a size and form in which the text information is to be displayed, and the like.

Accordingly, there is a growing need for intuitive and simple technology capable of performing a series of processes that obtain the text information corresponding to the user voice and display the obtained text information at an area on the display desired by the user.

DISCLOSURE

Technical Problem

Aspects of the disclosure are to address at least the above-mentioned problems and/or disadvantages and to provide at least the advantages described below. Accordingly, an aspect of the disclosure is to provide an electronic device capable of providing text information corresponding to a user voice through a user interface in an intuitive and a simple method and a controlling method thereof.

Technical Solution

According to an embodiment, an electronic device includes a display, a microphone, a memory configured to store at least one instruction, and a processor configured to execute the at least one instruction, and the processor is configured to identify, based on an image including at least one object being obtained, at least one object included in the image by analyzing the image, obtain, based on a user voice being received through the microphone, text information corresponding to the user voice by performing voice recognition on the user voice, identify an object corresponding to the user voice from among the at least one object included in the image, and control the display to display a memo user interface (UI) including the text information on an area corresponding to the object identified as corresponding to the user voice from among the areas on the display.

According to an embodiment, a control method of an electronic device including a display includes identifying, based on an image including at least one object being obtained, at least one object included in the image by analyzing the image, obtaining, based on a user voice being received, text information corresponding to the user voice by performing voice recognition on the user voice, identifying an object corresponding to the user voice from among the at least one object included in the image, and displaying a memo user interface (UI) including the text information on an area corresponding to the object identified as corresponding to the user voice from among the areas on the display.

DESCRIPTION OF DRAWINGS

FIG. 2 is a flowchart illustrating a control method of an electronic device according to an embodiment of the disclosure;

FIGS. 7A to 7C are diagrams illustrating an embodiment of an electronic device identifying an object corresponding to a user voice based on a touch interaction of the user;

FIGS. 11A and 11B are diagrams illustrating in detail an embodiment related to providing a selecting UI when there are two or more identified objects which correspond to a user voice;

DETAILED DESCRIPTION OF EXEMPLARY EMBODIMENTS

One or more embodiments of the disclosure will be described in detail below with reference to the accompanying drawings to assist those of ordinary skill in the art to which the disclosure pertains to easily comprehend the disclosure.

Figure 1:
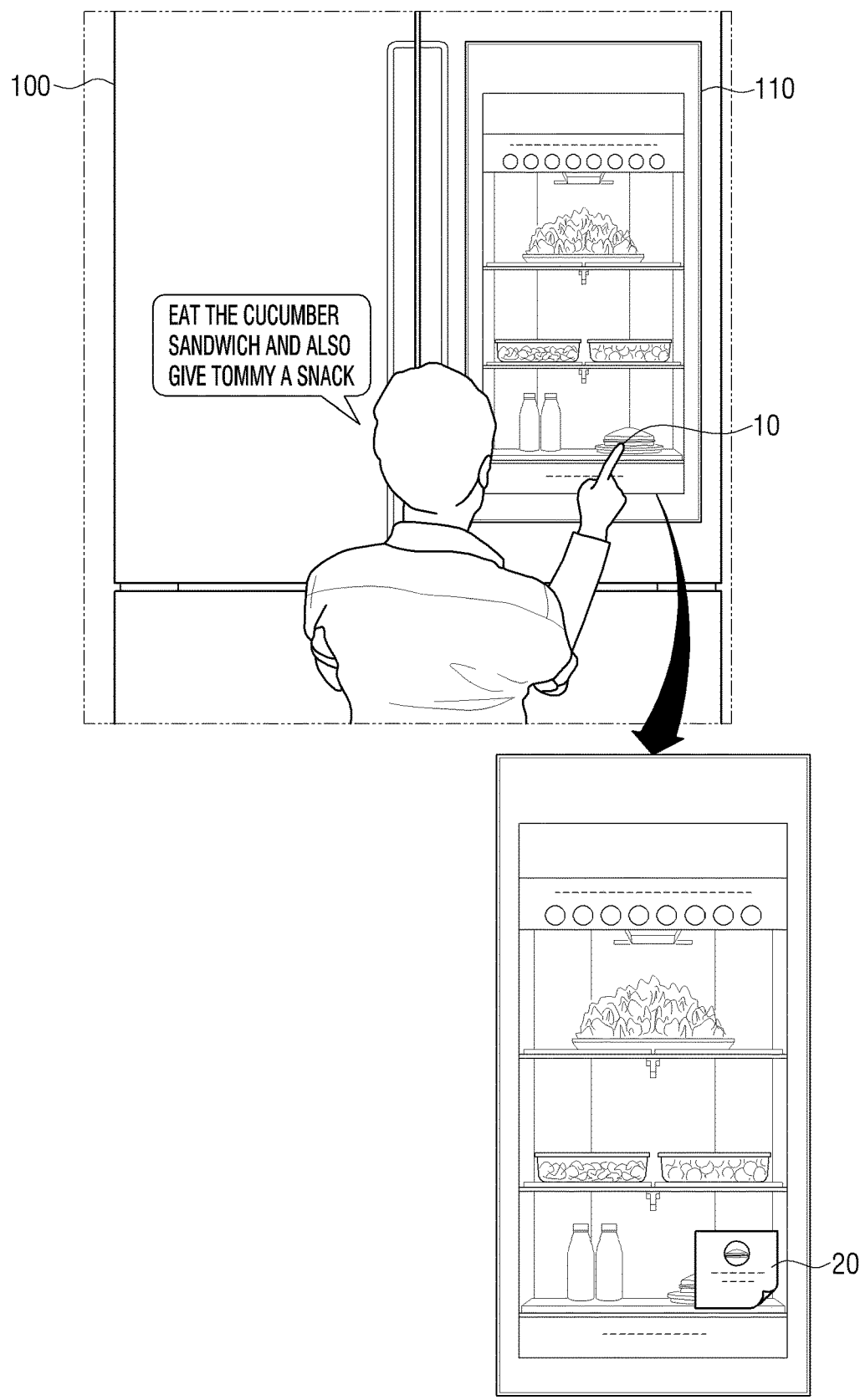
FIG. 1 is a conceptual diagram illustrating in brief a control process of an electronic device according to the disclosure.

FIG. 1 is a conceptual diagram illustrating in brief a control process of an electronic device 100 according to the disclosure.

As illustrated in FIG. 1, the electronic device 100 may receive a user voice and display a memo user interface (UI) based on the received user voice. Here, the memo UI may refer to a user interface including an obtained text information. The detailed description on the various information included in the memo UI will be described below.

Meanwhile, according to the various embodiment of the disclosure, an area in which the memo UI is displayed on the display 110 of the electronic device 100 may be determined based on at least one from among the user voice and a touch interaction of the user. The process of determining an area in which the memo UI is displayed on the display 110 of the electronic device 100 will be described in detail below.

The electronic device 100 may obtain an image including at least one object. Then, based on the image including at least one object being obtained, the electronic device 100 may identify the at least one object included in the image by analyzing the obtained image. For example, as illustrated in FIG. 1, based on the electronic device 100 being a refrigerator, the electronic device 100 may obtain an inside image of the refrigerator by capturing the inside of the refrigerator, and identify an object such as a "cabbage", a "broccoli", a "grape", a "juice" and a "sandwich" as at least one object included in the obtained image. However, it should be noted that the electronic device 100 according to the disclosure as described as an example is not limited to a refrigerator.

Meanwhile, the electronic device 100 may receive the user voice. Then, based on the user voice being received, the electronic device 100 may obtain text information corresponding to the user voice by performing a voice recognition on the received user voice. For example, as illustrated in FIG. 1, based on a user voice being received, the electronic device 100 may perform a voice recognition on the received user voice, and obtain text information such as "eat the cucumber sandwich and also give Tommy a snack" as text information corresponding to the user voice.

Meanwhile, the electronic device 100 may identify an object corresponding to the received user voice from among the at least one object identified as included in the image. Specifically, the object corresponding to the user voice may be identified based on at least one from among text information corresponding to the user voice and a received touch interaction of the user.

Specifically, based on information on the at least one object included in the image being included in the obtained text information, the electronic device 100 may identify the object corresponding to the information on the at least one object included in the obtained text information as an object corresponding to the user voice. For example, as illustrated in FIG. 1, based on information on an object such as a "cucumber sandwich" being included in the obtained text information, the electronic device 100 may identify the "cucumber sandwich" as the object corresponding to the user voice.

Meanwhile, based on a touch interaction of the user being received on the display 110, the electronic device 100 may identify the object corresponding to an area in which the touch interaction of the user is received from among the areas on the display 110 as the object corresponding to the user voice. For example, as illustrated in FIG. 1, based on a touch interaction 10 of the user being received on one area from among the areas on the display 110, the electronic device 100 may identify the "cucumber sandwich" which is the object corresponding to the area in which the touch interaction is received as the object corresponding to the user voice.

Meanwhile, the touch interaction of the user may be received while the user voice is being received, but the disclosure is not limited thereto. That is, the touch interaction of the user according to the disclosure may be received prior to the user voice is received or after the user voice is received. The point in time at which the touch interaction of the user is received and the various embodiments thereof will be described below with particular reference to FIG. 10B.

As described above, based on the object corresponding to the user voice being identified, the electronic device 100 may display a memo UI 20 including text information on an area corresponding to the object identified as corresponding to the user voice from among the areas on the display 110.

According to an embodiment as described above, the electronic device 100 may, in displaying the memo UI including text information corresponding to the user voice, display the memo UI on an area which corresponds with an intuitive recognition of the user that utters the user voice from among the areas on the display 110.

FIG. 2 is a flowchart illustrating a control method of an electronic device 100 according to an embodiment of the disclosure.

As illustrated in FIG. 2, the electronic device 100 may obtain an image including at least one object (S210). Specifically, the electronic device 100 may obtain an image including at least one object through a camera included in the electronic device 100, and receive and obtain an image including the at least one object from an external device.

Based on the image including the at least one object being obtained, the electronic device 100 may identify the at least one object included in the obtained image (S220). Specifically, the electronic device 100 may identify the at least one object included in the obtained image by analyzing the obtained image. Because the process of analyzing the obtained image may be performed through a so-called object recognition module, the image analysis or the object recognition process through the object recognition module will be described with reference to FIG. 4.

Meanwhile, the range of object to be identified as a result of object recognition regarding the image may be pre-set according to a type of the electronic device, a user setting, or the like. For example, based on the electronic device 100 being a refrigerator, the range of the object which is the subject of identification based on object recognition on an inside image of the refrigerator may be pre-set to a range to include only food products arranged inside the refrigerator, and exclude a shelf inside the refrigerator or an inner structure such as a storage container. At this time, an artificial intelligence model used to identify the object may be implemented as an artificial intelligence model trained to identify objects limited to found product types.

The electronic device 100 may receive the user voice (S230). Specifically, the electronic device 100 may receive the user voice through a microphone included in the electronic device 100, and receive the user voice from an external device. Here, the external device may include a user terminal such as a smart phone or a remote control device for controlling the electronic device 100. That is, the user terminal or the remote control device may receive the user voice through the microphone included in the user terminal or the remote control device, and transmit the received user voice to the electronic device 100. Accordingly, the electronic device 100 may receive the user voice from the user terminal or the remote control device.

Based on the user voice being received, the electronic device 100 may obtain text information corresponding to the received user voice (S240). The electronic device 100 may obtain text information corresponding to the user voice by performing a voice recognition on the received user voice. Specifically, because the voice recognition on the received user voice may be performed through a so-called automatic speech recognition (ASR) module, the process of voice recognition through the ASR module will be described with reference to FIG. 5.

Meanwhile, the received user voice may be the subject of voice recognition in its entirety, but only a portion from among the received user voice may also be the subject of voice recognition. Here, the user voice which is the subject of voice recognition may be specified based on a pre-set starting point and an end point.

Specifically, the starting point for specifying the user voice which is the subject of voice recognition may be the point in time in which a trigger input for performing the voice recognition is received. That is, based on the trigger input being received, the electronic device 100 may perform voice recognition on the received user voice after the trigger input is received, and obtain text information corresponding to the user voice.

According to an embodiment of the disclosure, the trigger input may be received through the touch interaction of the user received on the display. In other words, specifically, based on the pre-set touch interaction of the user which corresponds to the trigger input being received on the display, the electronic device 100 may perform voice recognition on the received user voice after the touch interaction of the user is received, and obtain text information corresponding to the user voice. For example, based on a multi-touch interaction which touches two or more points on the display concurrently being pre-set as corresponding to the trigger input for performing voice recognition, the electronic device 100 may perform voice recognition on the received user voice after the multi-touch interaction is received, and obtain text information corresponding to the user voice. As another example, the touch interaction received on the display being maintained for three seconds may be pre-set as a touch interaction corresponding to the trigger input.

Meanwhile, the trigger input may be received through the user voice which includes a pre-set trigger word. For example, based on the user voice of "hi ABC, I bought beer, drink it after work" being received when "hi ABC" is the pre-set trigger word, voice recognition on "bought beer, drink it after work" which is the user voice that is received after "hi ABC" is received may be performed, and text information corresponding to the user voice may be obtained.

Meanwhile, the end point for specifying the user voice which is the subject of voice recognition may be the point in time specified through End Point Detection (EPD) technology of various types. For example, the user voice which is the subject of voice recognition may be specified by dividing a voice segment and a non-voice segment from the received user voice based on edge information on the user voice, frequency characteristic information, or the like.

According to an embodiment of the disclosure, the end point for specifying the user voice which is the subject of voice recognition may be the point in time at which the touch interaction of the user received on the display is terminated. Specifically, the touch interaction of the user as described above may be received on the display and the received touch interaction may be maintained on the display. Then, the electronic device 100 may receive the user voice while the touch interaction of the user is being maintained on the display. Thereafter, when the touch interaction of the user which was being maintained on the display is terminated, the electronic device 100 may perform voice recognition on the user voice which was received until the point in time at which the touch interaction of the user is terminated, and obtain text information corresponding to the user voice.

As in the related art, if the end point of voice recognition is specified under the condition of the user voice not being received in the electronic device 100 for a pre-set period, the point in time at which the pre-set period has passed may be specified as the end point of the voice recognition, even when the user voice is not received in the electronic device 100 for a pre-set period due to the user hesitating utterance while uttering, and a problem which is in opposition to an intent of the user intent may arise. In addition thereto, according to the related art, when the user additionally utters the user voice of not desiring voice recognition after the user voice desiring voice recognition has been uttered and before the pre-set period has passed, voice recognition may be performed for not only the voice desiring voice recognition by the user but also for the voice not desiring voice recognition and a problem which is in opposition to the user intent may arise.

On the other hand, as in the embodiment of the disclosure as described above, if the end point of the voice recognition is specified based on the touch interaction of the user, the point in time which corresponds to the user intent may be specified as the end point of the voice recognition, and an accuracy of the End Point Detection (EPD) of the voice recognition may be improved accordingly.

As described in the above, according to an embodiment, the electronic device 100 may perform voice recognition on the user voice received while maintaining the touch interaction of the user on the display from among the received user voice, and obtain text information corresponding to the user voice accordingly.

Meanwhile, in the above, based on the microphone being in an activated state, the embodiment specifying the subject of voice recognition based on the touch interaction of the user from among the user voice in its entirety received through the microphone has been described, but according to another embodiment of the disclosure, based on the microphone not being in an activated state, the subject of voice recognition may be specified by controlling the time in which the microphone is activated based on the touch interaction of the user and performing voice recognition on the user voice in its entirety received through the activated microphone.

In the above, because the method of specifying the user voice which is the subject of voice recognition from among the received user voice has been described, the user voice which is the subject of voice recognition from among the received user voice may be referred simply as the 'user voice' below for convenience.

The electronic device 100 may identify an object corresponding to the received user voice from among the at least one object included in the image (S250). Here, the object corresponding to the user voice may be identified based on at least one from among text information corresponding to the user voice and the received touch interaction of the user.

Specifically, based on information on at least one object included in the image being included in the obtained text information, the electronic device 100 may identify the object corresponding to the information on the at least one object included in the obtained text information as the object corresponding to the user voice. That is, as described in the example above, when information on an object such as "beer" is included in the text information corresponding to the user voice, the electronic device 100 may identify "beer" as the object corresponding to the user voice.

Meanwhile, based on the touch interaction of the user being received on the display, the electronic device 100 may identify the object corresponding to the area to which the touch interaction of the user is received from among the areas on the display as the object corresponding to the user voice. The touch interaction of the user may be received while the user voice is being received, but as described above, the disclosure is not limited thereto.

Specifically, the electronic device 100 may display an image on the display, and receive the touch interaction of the user on the display. Then, the electronic device 100 may identify the object which is displayed on the area to which the touch interaction of the user is received from among the areas on the display as the object corresponding to the user voice. As in the example described above, the electronic device 100 may display an image including objects such as "beer," "cola," and "juice" on the display. Then, the electronic device 100 may receive the touch interaction of the user on the area in which "beer" is displayed from among the areas on the display. In this case, the electronic device 100 may identify "beer" as an object corresponding to the user voice.

When the object corresponding to the user voice is identified, the electronic device 100 may display the memo UI including text information on an area corresponding to the object identified as corresponding to the user voice from among the areas on the display (S260). That is, as in the above-described example, the electronic device 100 may display the memo UI including text information such as "bought beer, drink after work" on an area the object such as "beer" is displayed from among the areas on the display.

Meanwhile, the area which corresponds to the object identified as corresponding to the user voice may include an area in which the object identified as corresponding to the user voice is displayed on the display and an area within a pre-set distance from the area in which the object identified as corresponding to the user voice is displayed on the display. That is, in the above-described example, the electronic device 100 may include an area in which the object such as "beer" is displayed on the display and an area within a pre-set distance from the area in which the object such as "beer" is displayed on the display.

Meanwhile, based on there being two or more objects which are identified as corresponding to the user voice, the electronic device 100 may display a selecting UI including information on two or more objects on the display. Here, the selecting UI may refer to a user interface for receiving user input of selecting one from among the two or more objects. Then, when the user input of selecting one object from among the two or more objects is received through the selecting UI, the electronic device 100 may identify the selected one object as an object corresponding to the user voice. The embodiment related to providing the selecting UI will be described in greater detail with reference to FIGS. 11A and 11B.

Meanwhile, in the above, information on at least one object included in the text information corresponding to the user voice has been described as being information on a name of the at least one object included in the image, but according to an embodiment of the disclosure, the information on at least one object may include various information such as information on a duration of at least one object included in the image. In addition, the text information corresponding to the user voice may include not only information on the at least one object included in the image, but also a pronoun, and a user name. The embodiment related to the various information included in the text information corresponding to the user voice will be described in detail with reference to FIGS. 12, 13A and 13B.

According to one or more embodiments of the disclosure as described above, the electronic device 100 may display the memo UI on an area desired by the user based on text information corresponding to the user voice without a separate user manipulation of designating an area to which the memo UI including the text information is to be displayed on the display.

In addition, the electronic device 100 may specify the user voice which is the subject of voice recognition while concurrently determining an area to which the memo UI is to be displayed in a convenient and intuitive method based on the touch interaction of the user and display the memo UI.

Accordingly, the user of the electronic device 100 may generate text information corresponding to the user voice through the user interface using an intuitive and simple method, and display the text information generated in an area on the display which corresponds to user intent.

Figure 3A:
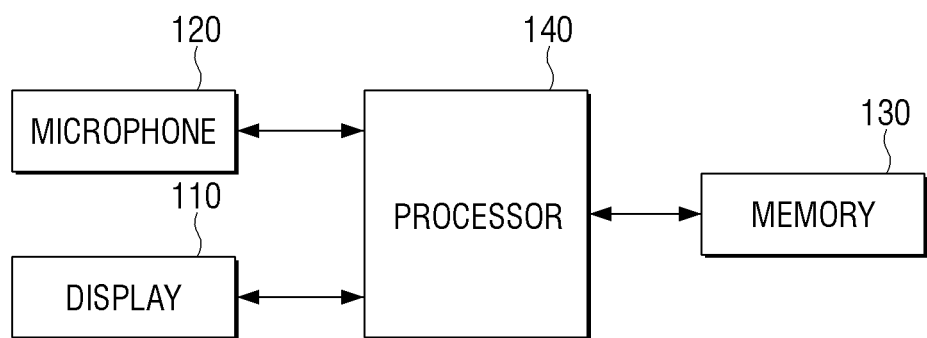
FIG. 3A is a block diagram illustrating in brief a configuration of an electronic device according to the disclosure.
Figure 3B:
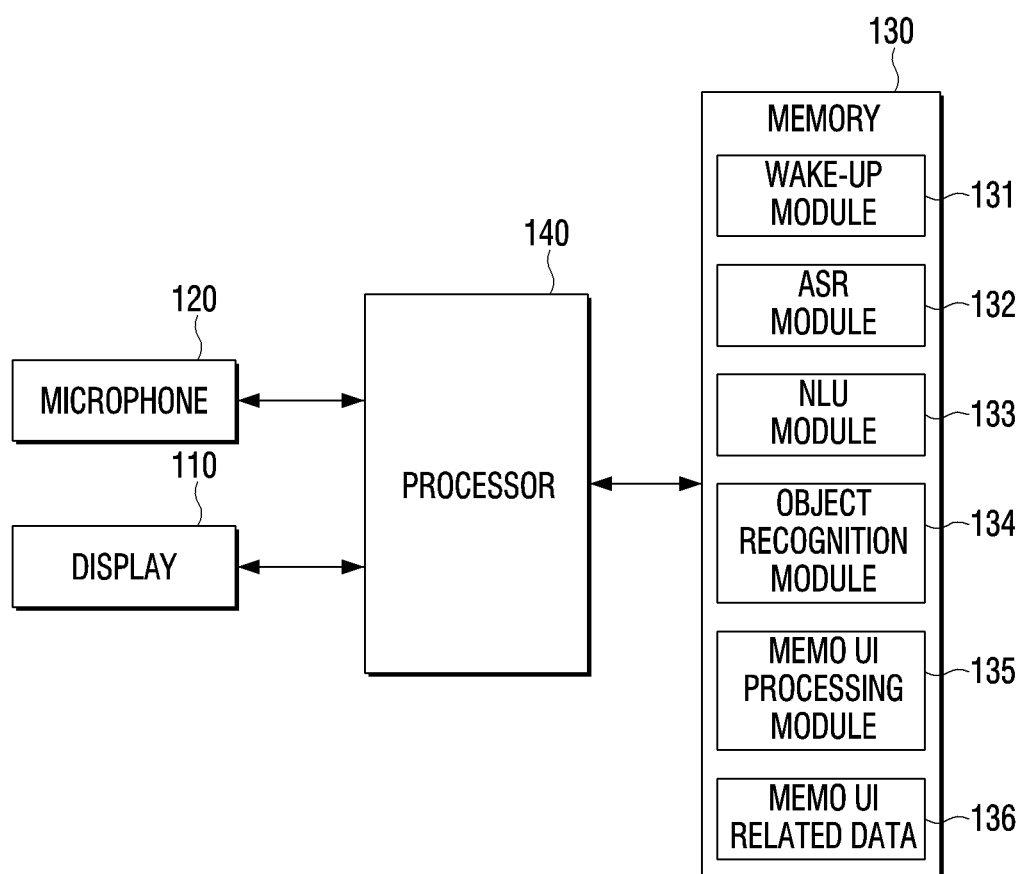
FIG. 3B is a diagram illustrating an embodiment of the disclosure based on a coupling relationship between a hardware configuration of the electronic device 100 as illustrated in FIG. 3A and a software module according to the disclosure.

FIG. 3A is a block diagram illustrating in brief a configuration of an electronic device 100 according to the disclosure, and FIG. 3B is a diagram illustrating an embodiment according to the disclosure based on a coupling relationship between a hardware configuration of the electronic device 100 as illustrated in FIG. 3A and a software module according to the disclosure.

As illustrated in FIGS. 3A and 3B, the electronic device 100 according to the disclosure may include a display 110, a microphone 120, a memory 130, and a processor 140.

The display 110 may output image data by the control of the processor 140. Specifically, the display 110 may output an image pre-stored in the memory 130 by the control of the processor 140. The display 110 stored in the memory 130 may be implemented as a liquid crystal display (LCD) panel, an organic light emitting diodes (OLED), and the like, and it may be possible for the display 110 to also be implemented as a flexible display, a transparent display, or the like in some cases. However, the display 110 according to the disclosure is not limited to a specific type.

The display 110 according to the disclosure may display an image which includes at least one object by the control of the processor 140, and may also display a user interface such as the memo UI, the selecting UI, the deleting UI, and the like.

The microphone 120 may receive sound or voice generated outside of the electronic device 100. Specifically, the microphone 120 may receive an audio signal according to the sound or voice generated outside of the electronic device 100, and convert the received audio signal to an electrical signal. Specifically, the microphone 120 according to the disclosure may receive the user voice generated by an utterance of the user.

The memory 130 may store at least one instruction related to the electronic device 100. Then, the memory 120 may be stored in an operating system (O/S) for driving the electronic device 100. In addition, the memory 130 may be stored with various software programs or applications for operating the electronic device 100 according to the various embodiments of the disclosure.

Specifically, the memory 130 may be stored with various software modules for operating the electronic device 100, and the processor 140 may be configured to control the operation of the electronic device 100 by executing the various software modules stored in the memory 130. That is, the memory 130 may be accessed by the processor 140, and reading/writing/modifying/deleting/updating or the like of data may be performed by the processor 140.

Meanwhile, the term memory 130 in the disclosure may be used as a meaning including a memory 130, a ROM (not shown) within a processor 140, a Ram (not shown) or a memory card (not shown) mounted to the electronic device 100 (e.g., micro SD card, memory stick), and may be used as a meaning including a non-volatile memory such as a flash memory, a programmable read-only memory (PROM), and the like, and a volatile memory such as a dynamic random-access memory (DRAM) and a static RAM (SRAM).

Specifically, as illustrated in FIG. 3B, the memory 130 according to the disclosure may be stored with a plurality of modules such as a wake-up module 131, an ASR module 132, a NLU module 133, an object recognition module 134, and a memo UI processing module 135. Here, the plurality of modules being stored in the memory 130 may refer to executing the plurality of modules, and all data necessary for performing the function of the plurality of modules being stored in the memory 130. Meanwhile, the memory 130 may be stored with data 136 associated with the memo UI.

Meanwhile, because the processor 140 may access the plurality of modules stored in the memory 130 and perform various operations according to the disclosure through the plurality of modules, the function of each of the plurality of modules will be described below.

The wake-up module 131 may refer to a module which determines whether or not to perform voice recognition on the user voice, and may be designated as the wake-on-voice (WoV) module. Specifically, based on the trigger input being received, the wake-up module 131 may determine voice recognition on the user voice which is received through the microphone 120 after the trigger input is received as having been performed.

The automatic speech recognition (ASR) module may refer to a module which obtains text information corresponding to the received user voice by performing voice recognition on the user voice. The ASR module 132 may include an acoustic model (AM), a pronunciation model (PM), a language model (LM), and the like, and obtain a text corresponding to the user voice through an artificial intelligence model such as an AM, a PM, and a LM.

The natural language understanding (NLU) module 133, as a module which performs understanding of natural language on the received user voice may include a domain classifier, and NLU engine or the like. The domain classifier may refer to a module identifying a domain associated with the user voice, and the NLU engine may refer to a module which performs understanding of natural language with respect to text information corresponding to the user voice by using a database for performing understanding of the natural language. That is, the NLU module 133 may perform a syntactic analysis and a semantic analysis on the text information corresponding to the user voice through the domain classifier, the NLU engine, or the like, and obtain information on the user intent.

The object recognition module 134 may extract the boundary within the image and identify whether or not an object is present and the location of the object. Then, the object recognition module 134 may identify at least one object included in the image through a 2D image matching, an optical character recognition, and an artificial intelligence model or the like for object recognition.

The memo UI processing module 135 may refer to a module performing the overall processing process related to the memo UT according to the disclosure. Specifically, the memo UI processing module 135 may generate and obtain a memo UT, store the memo UI in the memory 130, and perform image processing with respect to the memo UI, and handle the processing on the memo UI according to the disclosure in addition to the operation of controlling the display 120 to display the memo UI, or the like. Specifically, the memo UI processing module 135 may perform the overall processing process related to the memo UT according to the disclosure based on the memo UI related data 136 stored in the memory 130.

The memo UI related data 136 may refer to various data related to the memo UI according to the disclosure. That is, in describing the disclosure, the memo UI may be used as a collective meaning of data related to the memo UI according to the disclosure including text information included in the memo UI, information on the size, font, color, and the like of text information displayed in the memo UI, information on the object displayed in the memo UT, information on an UI item displayed in the memo UI, or the like.

Meanwhile, in the above, the processor 140 has been described as loading the plurality of modules stored in the memory 130, and the process of performing the operations according to the disclosure through the plurality of modules, but the above is merely to describe in detail the organic coupling of hardware and software for implementing the operations according to the disclosure, and the disclosure is not limited to the case of including a software architecture as illustrated in FIG. 2. That is, with the scope of achieving the object of the disclosure, the type and name of the plurality of modules may be implemented different from that illustrated in FIG. 3B. Then, in implementing the various embodiments of the disclosure, it should be understood that at least a portion of the plurality of modules as described through FIG. 3B may not be used.

Meanwhile, in FIG. 3B, the plurality of modules may be stored in the memory 130, the processor 140 may load the plurality of modules stored in the memory 130 and access the plurality of modules, and the plurality of modules are illustrated within the memory 130 based on the performing various operations according to the disclosure through the plurality of modules, but at least a portion from among the plurality of modules may be implemented as a dedicated chip capable of performing the function of the module and included in the processor 140.

The processor 140 may control the overall operation of the electronic device 100. Specifically, the processor 140 may be connected with configurations of the electronic device 100 including the microphone 120, the display 110, and the memory 130 a described above, and execute the at least one instruction stored in the memory 130 as described above to control the overall operation of the electronic device 100.

The processor 140 may be implemented to various methods. For example, the processor 140 may be implemented to at least one from among an application specific integrated circuit, (ASIC), an embedded processor, a microprocessor, a hardware control logic, a hardware finite state machine (FSM), or a digital signal processor (DSP). Meanwhile, the term processor 140 in the disclosure may be used as a meaning including a Central Processing Unit (CPU), a Graphic Processing Unit (GPU), a Main Processing Unit (MPU), and the like.

In particular, the processor 140 according to the disclosure may access the plurality of modules as described above, that is, the plurality of modules stored in the memory 130 and perform various operations according to the disclosure through the plurality of modules. The control process of the processor 140 according to the disclosure will be described in detail below with reference to FIG. 3B.

The processor 140 may obtain an image including at least one object. When an image is obtained, the processor 140 may input the obtained image in the object recognition module 134 and identify the at least one object included in the image. Then, the processor 140 may, by identifying the obtained image and the at least one object included in the image, store the information on the obtained at least one object in the memory 130, and identify the object corresponding to the user voice as described below based on the stored image and the information on the object. Here, the information on the at least one object may, for example, include information on the name of the object, a coordinate value corresponding to the location of the object within the image, and the like. The analyzing the image through the object recognition module 134 or the process of object recognition will be described in detail with reference to FIG. 4.

The processor 140 may receive the trigger input for performing the voice recognition. Here, the trigger input may not only be received through the microphone 120 in a form of the user voice including a pre-set trigger word, but also be received through an input button arranged on the electronic device 100 or received through a control signal received from a remote control device for controlling the electronic device 100.

When the trigger input is received, the processor 140 may determine whether or not voice recognition through the wake-up module 131 is to be performed. Specifically, when the trigger input is received, the processor 140 may determine whether or not to perform voice recognition by inputting the trigger input to the wake-up module 131. Then, when it is determined as performing voice recognition, the processor 140 may determine as performing voice recognition with respect to the user voice which is received through the microphone 120 after the trigger input is received. In other words, the point in time at which the trigger input is received may be the starting point for specifying the user voice which is the subject of voice recognition. The starting point and the end point for specifying the user voice which is the subject of voice recognition has been described with reference to FIG. 2, and redundant descriptions thereof will be omitted.

The processor 140 may receive the user voice through the microphone 120. When the user voice is received, the processor 140 may input the received user voice in the ASR module 132, and obtain text information corresponding to the user voice. The process of voice recognition through the ASR module 132 will be described in detail with reference to FIG. 5.

The processor 140 may receive the touch interaction of the user through the display 110. Specifically, the display 110 according to the disclosure may include a touch sensor for detecting the touch interaction of the user, and the processor 140 may receive the touch interaction of the user with respect to one area from among the areas on the display 110 through the touch sensor included in the display 110.

The touch sensor may be implemented as a sensor of various types such as a capacitive type, a resistive type, a piezoelectric type, and the like. In addition, the display 110 may detect a touch interaction which uses input means such as a stylus pen in addition to a finger of the user. Then, based on the input means of the touch interaction being a stylus pen including a coil within, the display 110 may include a magnetic field sensor capable of detecting the magnetic field changed by the coil within the stylus pen. Accordingly, the processor 140 may detect not only the touch interaction through the display 110, but also close proximity gestures, that is, hovering. Meanwhile, in the above, the display function of the display 110 and the detection function of the user touch interaction has been described as being performed on the same configuration, but may be performed in configurations different from one another.

The processor 140 may be configured to identify the object corresponding to the received user voice from among the at least one object included in the image. Here, the object corresponding to the user voice may be identified based on at least one from among the text information corresponding to the user voice obtained through the ASR module 132 and the touch interaction of the user received through the display 110.

Specifically, based on information on at least one object included in the image being included in the obtained text information, the processor 140 may identify the object corresponding to information on at least one object included in the obtained text information as an object corresponding to the user voice.

Meanwhile, when the touch interaction of the user is received on the display 110, the processor 140 may identify the object corresponding to the area to which the touch interaction of the user is received from among the areas on the display 110 as the object corresponding to the user voice. Specifically, the touch interaction of the user may be received while the user voice is being received, but it should be noted that the disclosure is not limited thereto as described above.

Specifically, the processor 140 may display an image on the display 110, and receive the touch interaction of the user on the display 110. Then, the processor 140 may identify the object displayed on the area to which the touch interaction of the user is received from among the areas on the display 110 as the object corresponding to the user voice.

The processor 140 may be configured to control the display 110 to display the memo UI including the text information. Specifically, when the object corresponding to the user voice is identified, the processor 140 may be configured to control the display 110 to display the memo UI including the text information on the area corresponding to the object identified as corresponding to the user voice from among the areas on the display 110. Here, the area corresponding to the object identified as corresponding to the user voice may include the area in which the object identified as corresponding to the user voice is displayed on the display 110 and the area within a pre-set distance from the area in which the object identified as corresponding to the user voice is displayed on the display 110.

Meanwhile, based on there being two or more objects identified as corresponding to the user voice, the processor 140 may display the selecting UI including information on the two or more objects on the display 110. Here, the selecting UI may refer to the user interface for receiving the user input of selecting one from among the two or more objects. Then, when the user input of selecting one object from among the two or more objects is received through the selecting UI, the processor 140 may identify the selected one object as the object corresponding to the user voice. The embodiment related to providing the selecting UI will be described in greater detail with reference to FIGS. 11A and 11B.

Meanwhile, in the above, the information on the at least one object included in the text information corresponding to the user voice has been described as being information on a name of the at least one object included in the image, but according to an embodiment of the disclosure, the information on the at least one object may include various information such as information on a duration of at least one object included in the image. In addition, the text information corresponding to the user voice may include note only information on at least one object included in the image, but also at least one from among a pronoun, a user name, and information on a user intent. The embodiment related to the various information included in the text information which corresponds to the user voice will be described in detail with reference to FIGS. 12, 13A, and 13C.

Figure 4:
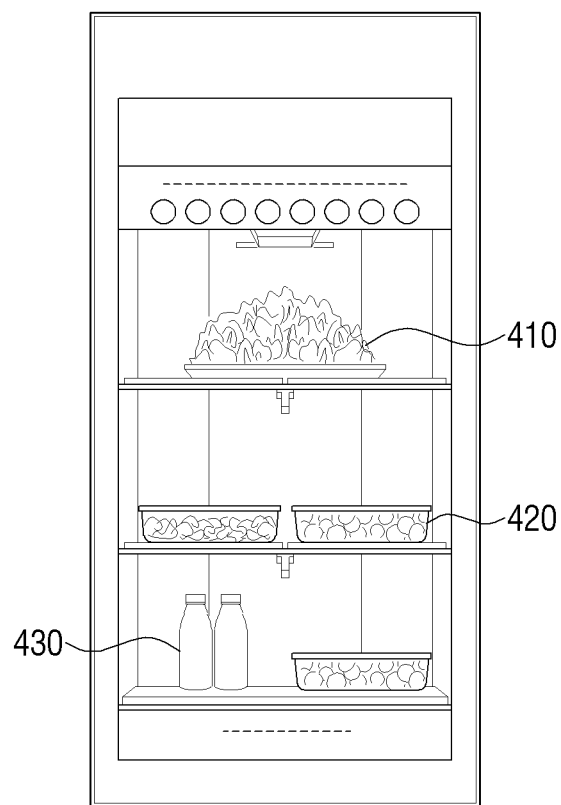
FIG. 4 is a diagram illustrating in greater detail an object recognition process according to the disclosure.

FIG. 4 is a diagram illustrating in greater detail an object recognition process according to the disclosure.

As described above, the electronic device 100 may obtain an image including at least one object. Then, when the image is obtained, the electronic device 100 may analyze the obtained image and identify the at least one object included in the image. Specifically, the electronic device 100 may identify the at least one object included in the image through the object recognition module. The various method of performing image analysis or object recognition through the object recognition module by the electronic device 100 will be described in detail.

The electronic device 100 may extract a boundary within the obtained image and identify whether or not an object is present and the location of the object. Then, the object recognition module may identify the at least one object included in the image through 2D image matching, Optical Character Recognition (OCR), artificial intelligence model for object recognition, and the like.

Specifically, the electronic device 100 may use various methods such as edge detection, corner detection, histogram feature detection, image high frequency analysis, image various analysis, and the like to extract the feature of the object included in the obtained image. Then, the electronic device 100 may obtain a likelihood for the object included in the obtained image to correspond to each of the plurality of categories for classifying the object based on the extracted features, and identify at least one object included in the image accordingly.

In an embodiment, when an object is classified through the 2D image matching, the electronic device 100 may obtain an image of the area in which each of the objects in the obtained image are included, compare the image with pre-stored images for each type of the plurality of objects, and identify the at least one object included in the image based on the similarity between the two images.

In another embodiment, based on the electronic device 100 being a refrigerator and the obtained image being an image of an inside of the refrigerator, the electronic device 100 may use the OCR technology to recognize a label of a food product or the like included in the image and identify the at least one object included in the image.

In still another embodiment, the electronic device 100 may perform object recognition through a trained artificial intelligence model. Specifically, the electronic device 100 may input the obtained image in the trained artificial intelligence model and identify the at least one object included in the image. Here, the artificial intelligence model may be an artificial intelligence model trained by using at least one from among machine learning, genetics, deep learning, and artificial intelligence algorithm such as classification algorithm, and may include at least one artificial neural network from among a convolutional neural network (CNN) and a recurrent neural network (RNN). However, there is no specific limitation to the type of artificial intelligence model according to the disclosure and the type the artificial neural network included therein.

For example, as illustrated in FIG. 4, based on the electronic device 100 being a refrigerator, the electronic device 100 may capture the inside of the refrigerator and obtain an inside image of the refrigerator. Then, the electronic device 100 may use the various methods as described above to perform an image analysis on the obtained image or object recognition. Then, based on the result of the object recognition, the electronic device 100 may identify objects such as a "cabbage" 410, a "grape" 420, a "juice" 430, and the like as at least one object included in the image.

Meanwhile, a range of the object which is the subject of identification based on performing object recognition on the image may be pre-set differently according to the type of the electronic device, the user setting, or the like. For example, based on the electronic device 100 being a refrigerator, the range of the object which is the subject of identification based on performing object recognition on the inside image of the refrigerator may be pre-set to a range including only the food products arranged inside of the refrigerator and excluding inside structures such as a shelf or a storage container inside the refrigerator. At this time, the artificial intelligence model used for identifying the object may be implemented as an artificial intelligence model trained to identify an object limited to a food product type.

Meanwhile, the object recognition module as described above may not only be included as an on-device in the electronic device 100, but also in an external device such as a server, and the electronic device 100 may be configured to transmit the obtained image to the server, and when object recognition on the image is performed by the object recognition module included in the server, by receiving the object recognition results from the server, identify the at least one object included in the image.

Figure 5:
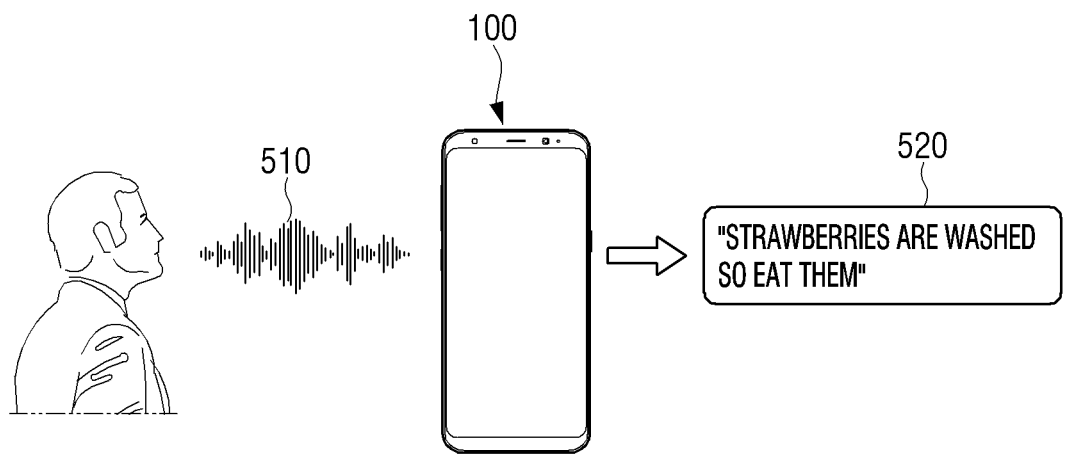
FIG. 5 is a diagram illustrating in greater detail a voice recognition process according to the disclosure.

FIG. 5 is a diagram illustrating in greater detail a voice recognition process according to the disclosure.

As described above, the electronic device 100 may receive the user voice. Then, when the user voice is received, the electronic device 100 may perform voice recognition on the received user voice and obtain text information corresponding to the user voice.

Specifically, the electronic device 100 may perform voice recognition based on an automatic speech recognition (ASR) module and obtain text information corresponding to the received user voice. The ASR module may include a feature extractor and a decoder. The feature extractor may extract feature information (feature vector) from the audio signal. Then the decoder may obtain voice recognition information corresponding the feature information extracted based on the acoustic model (AM), the pronunciation model (PM), the language model (LM), and the like. The voice recognition information may include pronunciation information, phoneme information, and character string information corresponding to the feature information obtained based on the acoustic model, and text data corresponding to the pronunciation information obtained based on the language model.

Specifically, the AM may extract an acoustic feature of the received user voice and obtain a phoneme sequence. The PM may include a pronunciation dictionary (pronunciation lexicon), and obtain a word sequence by mapping the obtained phoneme sequence to a word. Then, the LM may designate a likelihood to the obtained word sequence. Meanwhile, the ASR module may include an end-to-end voice recognition model in which the elements of AM, PM and LM are integrated as a single neural network.

For example, as illustrated in FIG. 5, the electronic device 100 may receive the user voice 510 generated by the user utterance, and obtain text information 520 such as "strawberries are washed so eat them" as text information corresponding to the user voice by using the ASR module as described above.

Meanwhile, the ASR module as described above may not only be included in the electronic device 100 as an on-device, but also included in an electronic device such as a server. Then, the electronic device 100 may transmit the received user voice to the server, and when voice recognition on the user voice is performed by the ASR module included in the server, obtain the text information corresponding to the user voice by receiving the result of voice recognition from the server.

Figure 6:
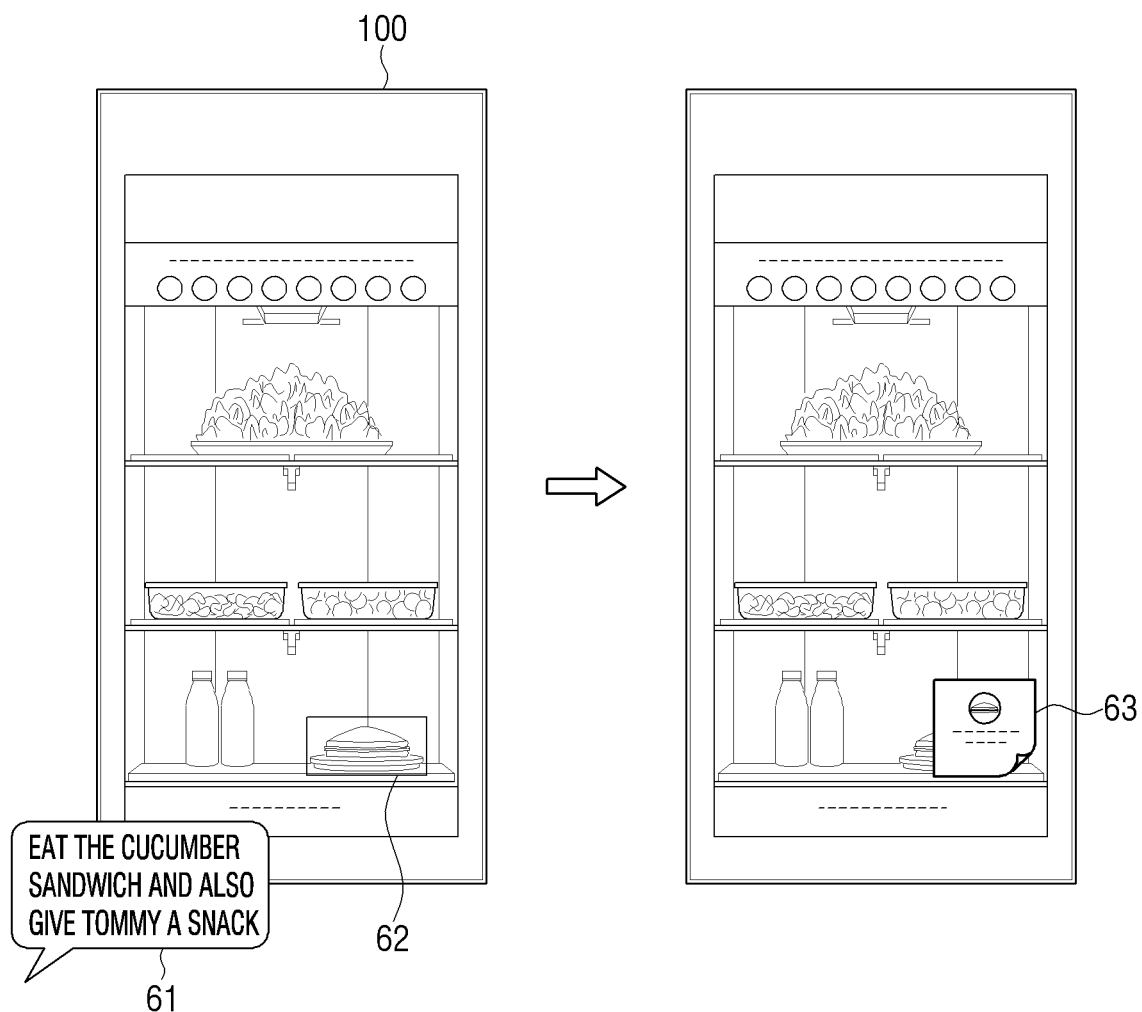
FIG. 6 is a diagram illustrating an embodiment of an electronic device identifying an object corresponding to a user voice based on text information corresponding to the user voice.

FIG. 6 is a diagram illustrating an embodiment of an electronic device 100 identifying an object corresponding to a user voice based on text information corresponding to the user voice.

As described above, the electronic device 100 may obtain an image, and identify at least one object included in the obtained image. Then the electronic device 100 may receive the user voice and obtain the text information corresponding to the received user voice.

In addition, the electronic device 100 may identify an object corresponding to the user voice from among the at least one object included in the image. Specifically, the object corresponding to the user voice may be identified based on at least one from among the text information corresponding to the user voice and the received touch interaction of the user. The process of identifying an object corresponding to the user voice based on the text information corresponding to the user voice will be described below with reference to FIG. 6.

When information on at least one object is included in the text information corresponding to the user voice, the electronic device 100 may identify the object corresponding to the user voice from among the at least one object included in the image based on the information on the at least one object included in the text information. Specifically, when information on the at least one object is included in the text information corresponding to the user voice, the electronic device 100 may identify the object corresponding to information on the at least one object from among the at least one object included in the image as the object corresponding to the user voice.

For example, as illustrated in FIG. 6, the electronic device 100 may obtain an image, and identify the at least one object included in the image by analyzing the obtained image. Specifically, based on the electronic device 100 being a refrigerator, the electronic device 100 may obtain an inside image of the electronic device 100 as illustrated in FIG. 6, and identify a "cucumber sandwich" 62 as the at least one object included in the obtained image.

Then, the electronic device 100 may receive the user voice, perform voice recognition on the received user voice and obtain text information 61 such as "eat the cucumber sandwich and also give Tommy a snack" as the text information corresponding to the user voice. When information on the "cucumber sandwich" 62 which is the at least one object included in the image is included in the text information corresponding to the user voice, the electronic device 100 may identify the "cucumber sandwich" 62 as the object corresponding to the user voice.

Meanwhile, in the example as described above, the "cucumber sandwich" 62 being identified as the at least one object included in the image based on object recognition on the obtained image has been described, but "sandwich" and not "cucumber sandwich" may be identified as the at least one object included in the image based on object recognition. However, even in this case, the electronic device 100 may identify the "sandwich" from among the at least one object included in the image as the object corresponding to the user voice. In other words, the disclosure is not limited to the case of the name of the identified object and the name of the at least one object identified as being included in the image being the same based on the information on the at least one object included in the text information, and may be applicable to when any one from among the names of both objects are included to the other one.

As described above, when the object corresponding to the user voice is identified based on the text information corresponding to the user voice, the electronic device 100 may display the memo UI 63 including text information on an area corresponding to the object identified as corresponding to the user voice from among the areas on the display. The various embodiments related to the memo UI will be described below with reference to FIGS. 8A to 9B.

Figure 7A:
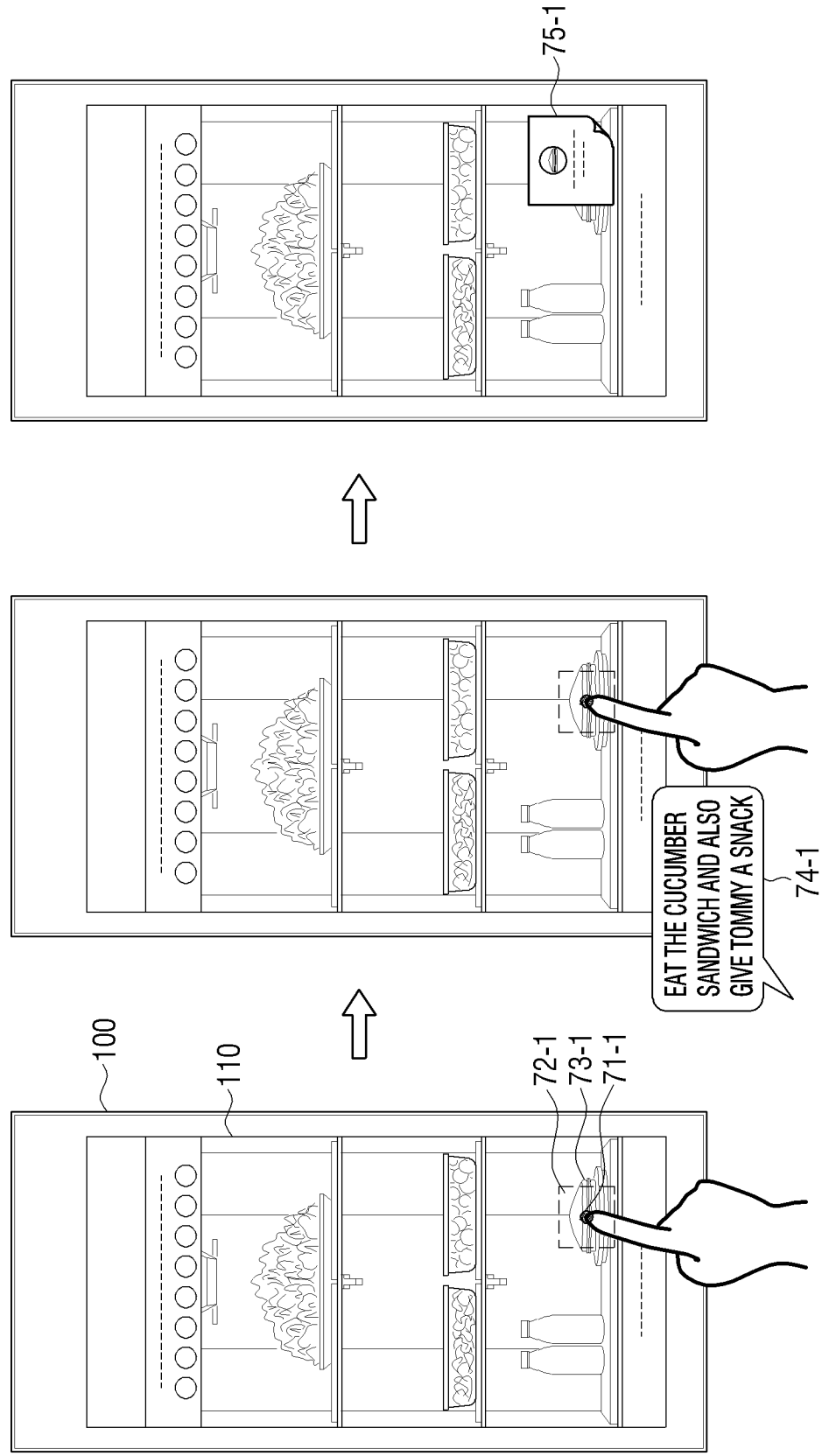
Figure 7C:
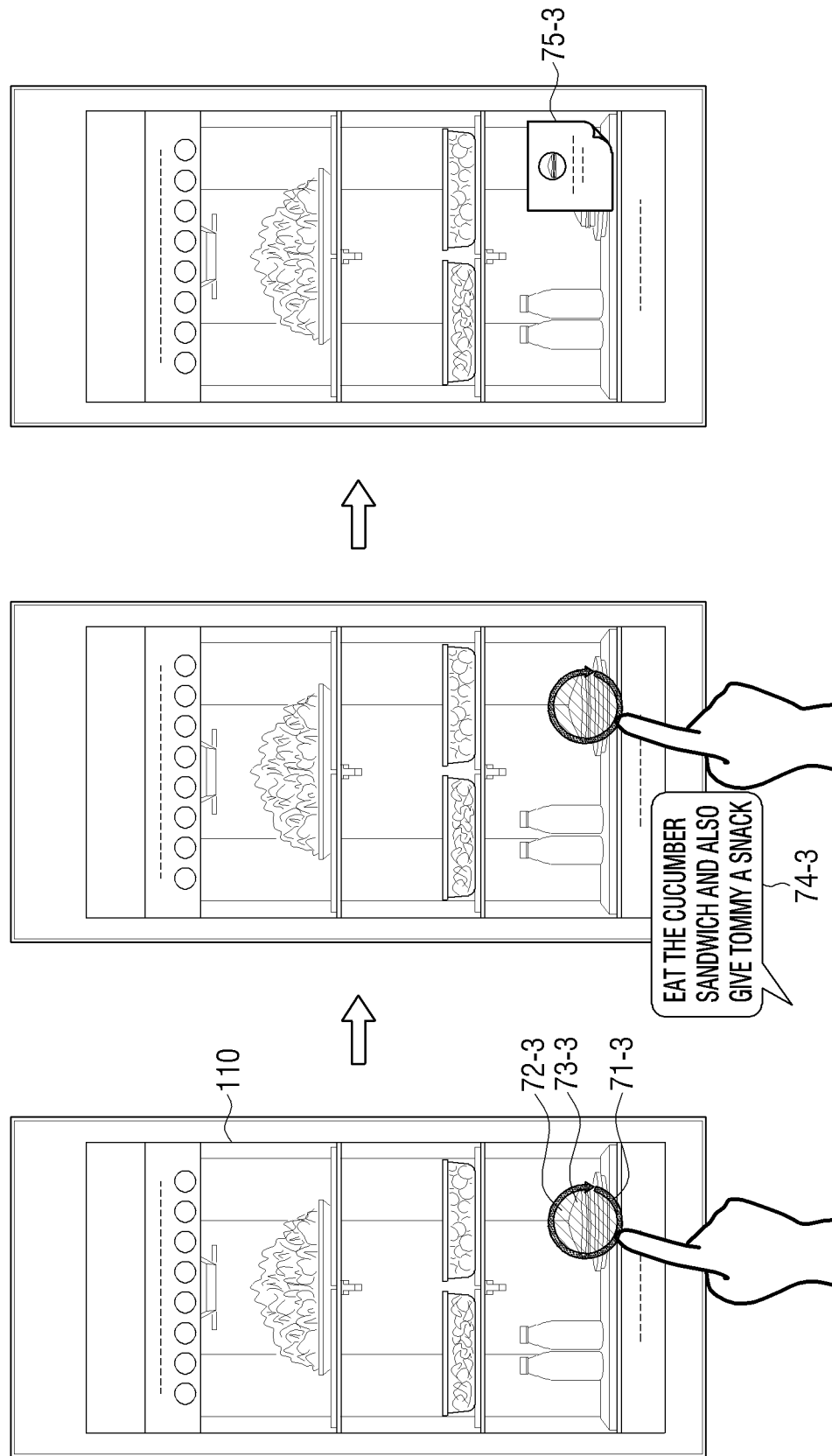

FIGS. 7A to 7C are diagrams illustrating an embodiment of an electronic device 100 identifying an object corresponding to a user voice based on a touch interaction of the user.

As described above, the electronic device 100 may obtain an image, and identify at least one object included in the obtained image. Then, the electronic device 100 may receive the user voice, and obtain text information corresponding to the received user voice.

In addition, the electronic device 100 may identify the object corresponding to the user voice from among the at least one object included in the image. Specifically, the object corresponding to the user voice may identify based on the text information corresponding to the user voice and the at least one from among the received touch interaction of the user. The process of identifying the object corresponding to the user voice based on the touch interaction of the user will be described below with reference to FIGS. 7A to 7C.

Specifically, the touch interaction of the user may be a single touch interaction of touching one point 71-1 on the display 110 as illustrated in FIG. 7A. Then, when the single touch interaction is received, the electronic device 100 may identify the area 72-1 to which the touch interaction is received from among the areas on the display 110 based on the location of the touched point 71-1 according to the signal touch interaction. Specifically, the electronic device 100 may identify an area within a pre-set range from the point 71-1 which was touched according to the single touch interaction from among the areas on the display 110, and identify the identified area as the area 72-1 in which the touch interaction is received. Then, the electronic device 100 may identify the object 73-1 corresponding to the area 72-1 to which the touch interaction is received from among the areas on the display 110 as the object corresponding to the user voice.

In addition, the touch interaction of the user may be a multi-touch interaction of concurrently touching two or more points 71-2 on the display 110 as illustrated in FIG. 7B. Then, when the multi-touch interaction is received, the electronic device 100 may identify the area 72-2 to which the touch interaction is received from among the areas on the display 110 based on the location 71-2 of two or more points touched according to the multi-touch interaction. Specifically, the electronic device 100 may identify the area in which two or more points 71-2 touched according to the multi-touch interaction are included from among the areas on the display 110, and identify the identified area as the area 72-2 in which the touch interaction is received. Then, the electronic device 100 may identify the object 73-2 corresponding to the area 72-2 in which the touch interaction is received from among the areas on the display 110 as the object corresponding to the user voice.

The touch interaction of the user may be a drag interaction realized along a closed curve in which a plurality of points 71-3 are connected on the display 110 as illustrated in FIG. 7C. Then, when the drag interaction is received, the electronic device 100 may identify the area 72-3 to which the touch interaction is received from among the areas on the display 110 based on the closed curve according the drag interaction. Specifically, the electronic device 100 may identify an area in which the closed curve according to the drag interaction is included from among the areas on the display 110, and identify the identified area as the area 72-3 in which the touch interaction is received. Then, the electronic device 100 may identify the object corresponding to the area 72-3 in which the touch interaction is received from among the areas on the display 110 as the object 73-3 corresponding to the user voice Meanwhile, in the above, the object corresponding to the area in which the touch interaction is received may be an object displayed on an area in which the touch interaction is received from among the areas on the display 110. Specifically, the electronic device 100 may display the image on the display 110, and identify the object displayed on the area in which the touch interaction is received from among the areas on the display 110 as the object corresponding to the user voice.

As described above, when the object corresponding to the user voice is identified based on the user interaction, the electronic device 100 may display memo UIs 75-1, 75-2 and 75-3 including text information 74-1, 74-2 and 74-3 on the area corresponding to the object identified as corresponding to the user voice from among the areas on the display 110. The various embodiments related to the memo UI will be described below with reference to FIGS. 8A to 9B.

According to the various embodiments of the disclosure as described above, the electronic device 100 may specify the user voice which is the subject of voice recognition based on the touch interaction of the user while currently determining the area to which the memo UI is to be displayed in a convenient and intuitive manner and display the memo UI.

Figure 8A:
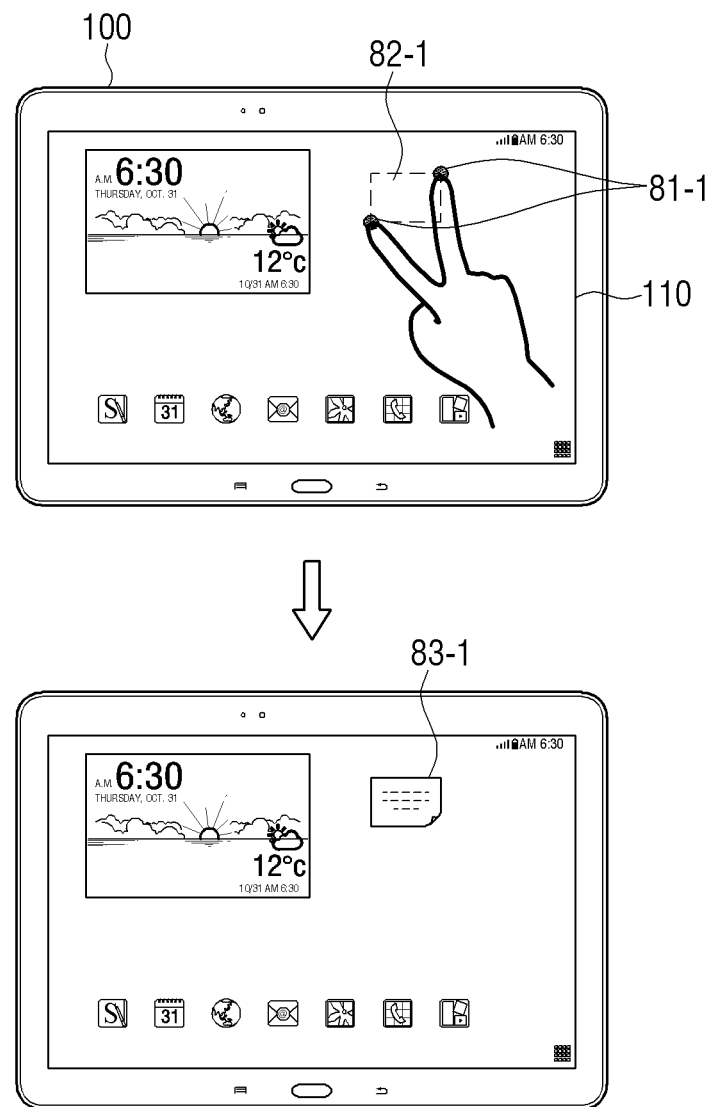
FIGS. 8A and 8B are diagrams illustrating an embodiment related to displaying a size and form of a memo UI differently based on a touch interaction of a user.
Figure 8B:
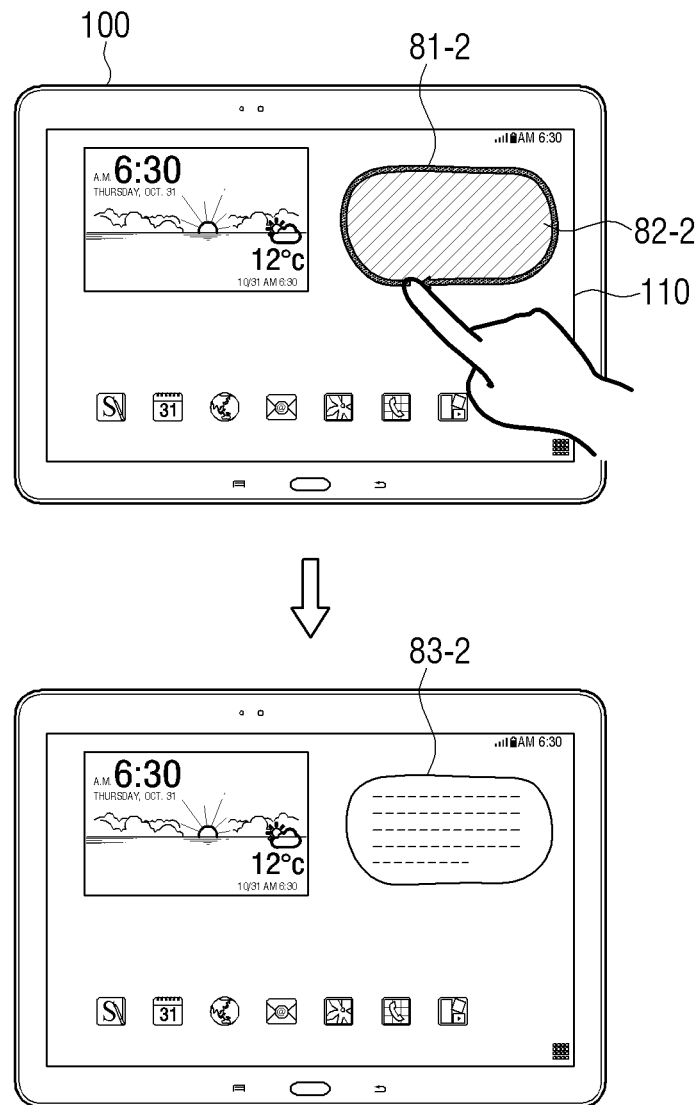

FIGS. 8A and 8B are diagrams illustrating an embodiment related to displaying a size and form of a memo UI differently based on a touch interaction of a user.

In the above, the embodiment of identifying the object corresponding to the user voice from among the at least one object included in the image based on touch interactions of various types, and displaying the memo UI including text information on the area corresponding to the object identified as corresponding tot eh user voice from among the areas on the display 110 has been described with reference to FIGS. 7A to 7C.

That is, in the above, the embodiment of determining an area to which the memo UI is to be displayed based on the touch interaction of the user has been described, but according to the disclosure, the size and form of the memo UI may also be determined according to the various types of touch interaction of the user.

Specifically, as illustrated in FIG. 8A, the touch interaction of the user may be a multi-touch interaction of concurrently touching two or more points 81-1 on the display 110. Then, when the multi-touch interaction is received, the electronic device 100 may identify the area 82-1 to which the touch interaction is received from among the areas on the display 110 based on the location of two or more touched points 81-1 according to the multi-touch interaction. Specifically, the electronic device 100 may identify the size and form of the area 82-1 which includes the touched two or more coordinate values according to the multi-touch interaction from among the areas on the display 110. Then, the electronic device 100 may display the memo UI 73-1 on the display 110 in the size and form corresponding to the size and form of the identified area 82-1 according to the multi-touch interaction.

Meanwhile, as illustrated in FIG. 8B, the touch interaction of the user may be a drag interaction realized along a closed curve 81-2 of which a plurality of points are connected on the display 110. Then, when the drag interaction is received, the electronic device 100 may identify the area 82-2 in which the touch interaction is received from among the areas on the display 110 based on the closed curve according to the drag interaction. Specifically, the electronic device 100 may identify the size and form of the area 82-2 in which the touched plurality of coordinate values are included according to the drag interaction from among the areas on the display 110. Then, the electronic device 100 may display the memo UI 83-2 on the display 110 in a size and form corresponding to the size and form of the identified area 82-2 according to the drag interaction.

Meanwhile, the touch interaction of the user being received on an area in which the object is not displayed has been illustrated in FIGS. 8A and 8B, but as illustrated in FIGS. 7A to 7C, even when the touch interaction of the user is received on the area in which the object is displayed, the size and form of the memo UI may be determined based on the touch interaction of the user.

As described above, according to the various embodiments of the disclosure, the electronic device 100 may determine not only the area in which the memo UI is displayed based on a one time touch interaction of the user, but also the size and form of the memo UI and may display the memo UI.

Figure 9A:
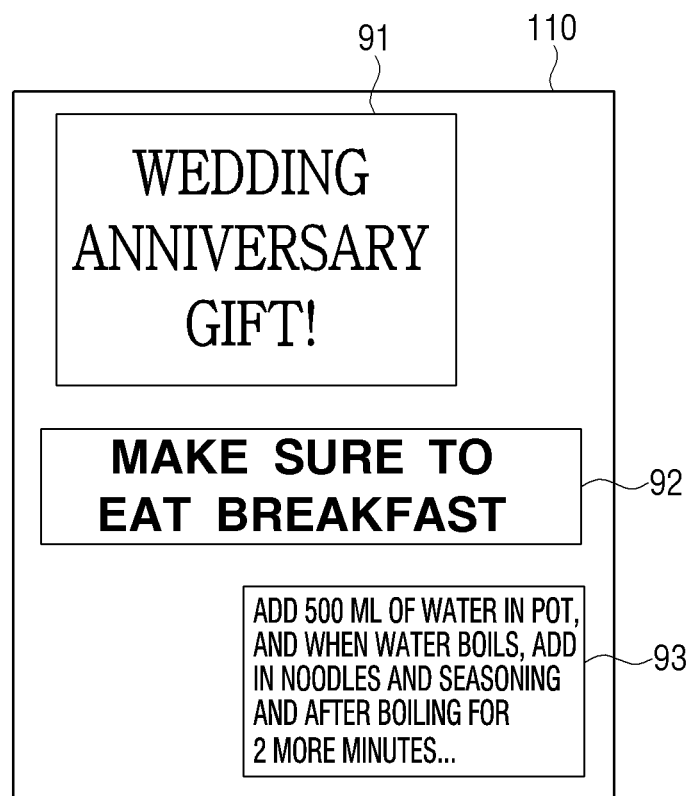
FIGS. 9A and 9B are diagrams illustrating various forms related to a memo UI according to the disclosure.
Figure 9B:
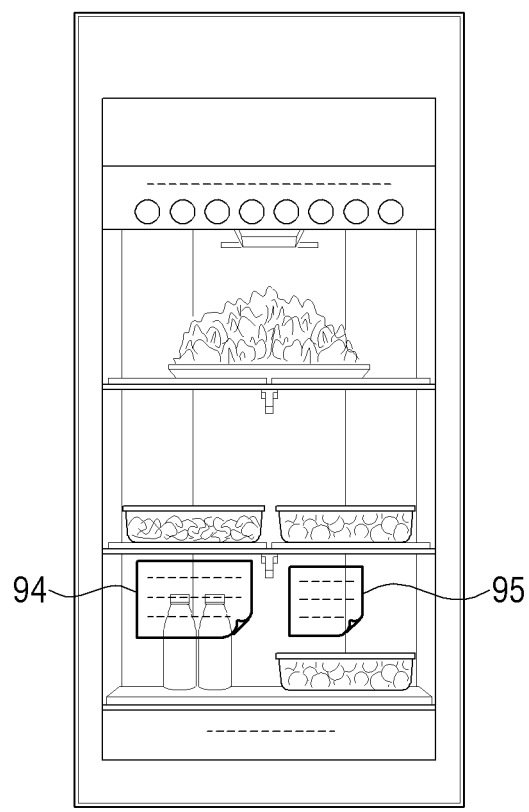

FIGS. 9A and 9B are diagrams illustrating various forms related to a memo UI according to the disclosure.

As illustrated in FIG. 9A, the memo UI according to the disclosure may include text information such as "wedding anniversary gift!" 91 (hereinafter, referred to as first text information 91), "make sure to eat breakfast" 92 (hereinafter, referred to as second text information 92), and "add 500 ml of water in a pot, and when the water boils, add in the noodles and the seasoning and after boiling for 2 more minutes . . . " 93 (hereinafter, referred to as third text information 93). Then, the first text information 91, the second text information 92, and the third text information 93 may be displayed in sizes, fonts, colors, or the like of various types.

Specifically, the size of the text information displayed through the memo UI according to the disclosure may be determined based on the size in which the memo UI is displayed. For example, as illustrated in FIG. 9A, based on the size of the memo UI in which the first text information 91 is displayed being determined to be bigger than the memo UI in which the second text information 92 is displayed, the first text information 91 may be displayed greater than the second text information 92.

Meanwhile, the size in which text information according to the disclosure is displayed through the memo UI may be determined based on the amount of text information. For example, when the second text information 92 and the third text information 93 of the same size is displayed in the memo UI, the size of the second text information 92 which includes a relatively smaller number of words may be determined to be bigger than the size of the third text information 93.

Meanwhile, the size in which the text information according to the disclosure is displayed through the memo UI may be determined based on the size of the received user voice. For example, the greater the size of the user voice corresponding to the text information, the bigger the text information may be displayed through the memo UI. Here, the information on the size of the user voice may be obtained based on the acoustic feature of the user voice obtained through the ASR module as described above.

Meanwhile, the size, the font, and the color of the text information displayed through the memo UI according to the disclosure may be determined differently according to the user who uttered the user voice corresponding to the text information. Here, the user who uttered the user voice may be identified based on a voice print analysis of the user voice or the object recognition on the user image obtained through a camera.

Specifically, when the user voice is received, the electronic device 100 may identify the user who uttered the received user voice based on information on the voice print of the received user voice. Here, the voice print may be identification information which may be obtained by analyzing the frequency of the user voice, and may be used in voice recognition in that the frequency form of the voice for each user is unique. Specifically, the electronic device 100 may obtain information on the voice print of the received user voice, and identify the user who uttered the user voice by comparing information on the voice print of the user with information on a pre-stored voice print.

Meanwhile, the electronic device 100 may obtain the user image through the camera while the users voice is being received, and identify the user who uttered the user voice by performing object recognition on the obtained user image. Specifically, the electronic device 100 may identify the user who uttered the user voice by comparing the image of the user obtained through the camera with the image of the user which was pre-registered.

As described above, when the user who uttered the user voice is identified, the electronic device 100 may determine the size, the font, the color or the like of the text information which is displayed through the memo UI differently according to the identified user. Specifically, the electronic device 100 may store setting information on the size, the font, the color, or the like of the text information preferred by the user and determine the size, the font, the color, or the like of the text information displayed through the memo UI based on the setting information corresponding to the identified user. When the size, the font, the color, or the like of the text information displayed through the memo UI is determined, the text information may be displayed through the memo UI in the determined size, font, color, or the like.

For example, based on the identified user being 'grandmother' from among the user family that uses the electronic device 100, the electronic device 100 may display the text information in a large, a font that has good readability, and in the color black through the memo UI based on the setting information corresponding to 'grandmother' who is the identified user. In addition, based on the identified user being 'daughter' from among the user family that uses the electronic device 100, the electronic device 100 may display the text information in a large, a font with good aesthetic sensibility, and in the color sky-blue through the memo UI based on the setting information corresponding to 'daughter' who is the identified user.

Meanwhile, when the memo UI is displayed while the image on the display 110 is in a displayed state, the memo UI may cover one area of the displayed image and may be displayed on the one area, or may be displayed in a transparent form on the one area of the displayed image. For example, as illustrated in FIG. 9B, the memo UI 94 and 95 may be displayed in a transparent form on one area of the displayed image, while an object corresponding to the area in which the memo UI 94 and 95 are displayed may also be displayed. Meanwhile, based on the memo UIs 94 and 95 being displayed in the transparent form, the degree of transparency may be changed by the user setting.

Meanwhile, the image displayed on the display 110 may not only be an image which is displayed on the display 110 by processing the image obtained through the camera, but may also be an image which is displayed on a transparent display 110 in which an object arranged at the rear surface of the display 110 passes through the transparent display 110. Even when the image is displayed passing through the transparent display 110, the memo UT according to the disclosure may be displayed in various types as described above on the image.

Meanwhile, in the above, the text information being displayed through the memo UT has been described, but the memo UI may further include various information related to the object identified as corresponding to the user voice. For example, the electronic device 100 may display an image in which the area corresponding to the object identified as corresponding to the user voice is captured in the image through the memo UI, and further, information which is pre-stored or related to the object corresponding to the user voice may be received from the external device and displayed.

According to the various embodiments of the disclosure as described above, the electronic device 100 may display text information in the size, the font, and the color of various types according to the user voice and who the user that uttered the user voice is, and may provide a user customized memo UT in an intuitive manner.

Figure 10A:
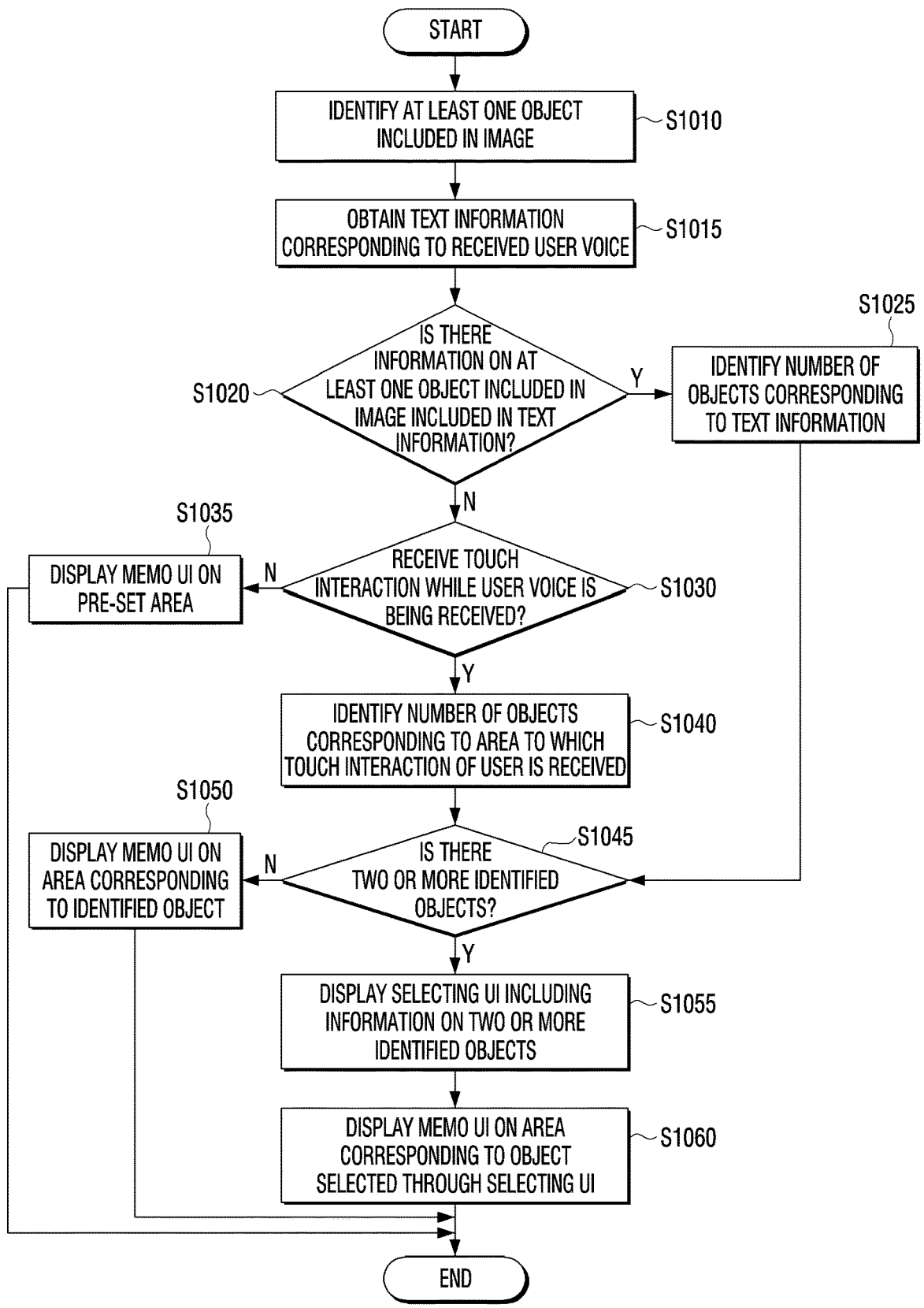
FIG. 10A is a diagram illustrating comprehensively an embodiment of a process identifying an object corresponding to a user voice according to the disclosure and a case in which there are two or more objects corresponding to a user voice.

FIG. 10A is a diagram illustrating comprehensively an embodiment of a process identifying an object corresponding to a user voice according to the disclosure and a case in which there are two or more objects corresponding to a user voice.

In the above, the process of identifying an object corresponding to the user voice has been described briefly with reference to FIG. 2 (S250). Further, the process of identifying an object corresponding to the user voice based on text information corresponding to the user voice has bee described in detail with reference to FIG. 6. Further, the process of identifying an object corresponding to the user voice based on the touch interaction of the user ha been described in detail with reference to FIGS. 7A to 7C. The embodiment of identifying an object corresponding to the user voice taking into consideration whether information on the at least one object included in the image is included in the text information corresponding to the user voice (S1020) and whether the touch interaction has been received on the display while the user voice is being received (S1030) will be described below with reference to FIG. 10A.

As illustrated in FIG. 10A, the electronic device 100 may identify at least one object included in the image (S1010). Specifically, the electronic device 100 may obtain an image, and identify the at least one object included in the image by analyzing the obtained image.

The electronic device 100 may obtain text information corresponding to the received user voice (S1015). Specifically, the electronic device 100 may receive the user voice, and obtain text information corresponding to the user voice by performing voice recognition on the received user voice.

Meanwhile, the electronic device may, as illustrated in FIG. 10A, identify the object corresponding to the user voice based on whether information on the at least one object included in the image is included in the text information corresponding to the user voice and whether the touch interaction is received on the display while the user voice is being received.

First, the electronic device 100 may identify whether information on the at least one object included in the image is included in the text information corresponding to the user voice (S1020). If information on the at least one object is included in the text information corresponding to the user voice (S1020-Y), the electronic device 100 may identify the number of objects corresponding to the text information (S1025). Specifically, the electronic device 100 may identify the number of objects corresponding to the text information based on information on the at least one object included in the text information. For example, "beer," "chicken," and "strawberry" may be identified as objects included in the image, and if information on objects such as "beer" and "chicken" is included in the text information corresponding to the user voice the electronic device 100 may identify the number of objects corresponding to the text information from among the objects included in the image as two.

Meanwhile, if information on the at least one object is not included in the text information corresponding to the user voice (S1020-N), the electronic device 100 may identify whether the touch interaction of the user has been received on the display while the user voice is being received (S1030).

Then, if the touch interaction of the user is not received on the display while the user voice is being received (S1030-N), the electronic device 100 may display the memo UI on a pre-set area from among the areas on the display (S1035). Specifically, the electronic device 100 may display the memo UI on the pre-set area from among the areas on the display to display the memo UI when information on the at least one object included in the image is not included in the text information and the touch interaction of the user is not received on the display while the user voice is being received. Here, the pre-set area may be, for example, a center area on the display.

If the touch interaction of the user is received on the display while the user voice is being received (S1030-Y), the number of objects corresponding to the area in which the touch interaction of the user is received may be identified (S1040). For example, if objects such as "beer" and "chicken" are displayed on the display in an area within the pre-set distance from the point at which the touch interaction of the user is received, the electronic device 100 may identify the number of objects corresponding to the area in which the touch interaction of the user is received as two.

As described above, when the number of objects corresponding to text information or the number of objects corresponding to the area in which the touch interaction of the user is received is identified, the electronic device 100 may identify the object identified as corresponding to the area in which text information or the touch interaction of the user is received being two or more (S1045).

If the object identified as corresponding to the area in which text information or the touch interaction of the user is received is not two or more (S1045-N), the electronic device 100 may display the memo UI on the area corresponding to the object identified as corresponding to the area in which the text information or the touch interaction of the user is received from among the areas on the display (S1050).

If the object identified as corresponding to the area in which the text information or the touch interaction of the user is received is two or more (S1045-Y), the electronic device 100 may display the selecting UI which includes information on two or more objects identified as corresponding to the area in which the text information or the touch interaction of the user is received on the display (S1055). Then, the electronic device 100 may display the memo UI on the area corresponding to the object selected through the selecting UI from among the areas on the display (S1060).

Here, the embodiment related to providing the selecting UI will be described in detail with reference to FIGS. 11A and 11B.

Meanwhile, in the above, the embodiment of identifying an object corresponding to the user voice and the number thereof by identifying whether information on the at least one object included in the image is included in the text information corresponding to the user voice (S1020), and then identifying whether the touch interaction of the user is received on the display while the user voice is being received (S1030) has been described with reference to FIG. 10A, according to still another embodiment of the disclosure, the order of steps S1020 and S1030 may be interchangeable, and as described with reference to FIGS. 6 and 7A to 7C, the text information corresponding to the user voice and the touch interaction of the user received on the display may be an independent standard for identifying the object corresponding to the user voice.

Meanwhile, as described above, the range of the object which is the subject of identification based on the object recognition on the image may be pre-set differently according to the type of the electronic device, the user settings, or the like. For example, based on the electronic device 100 being a refrigerator, the range of the object which is the subject of identification based on object recognition on the inside image of the refrigerator may be pre-set to a range that includes only food products arranged inside the refrigerator, and excluding inside structures such as a shelf or a storage container inside the refrigerator.

Based on object recognition of the image, if an object included in the range of the pre-set object is not identified, the electronic device 100 may determine the area which the memo UI is to be displayed based on the touch interaction of the user. In addition, the electronic device 100 may without performing the process of obtaining an image, the process of identifying the at least one object included in the obtained image, and the like, determine the area which the memo UI is to be displayed based on the touch interaction of the user. As described above, the embodiment of determining an area which the memo UI is to be displayed based on the touch interaction of the user and without depending on the object included in the image will be described below with reference to FIG. 10B.

Figure 10B:
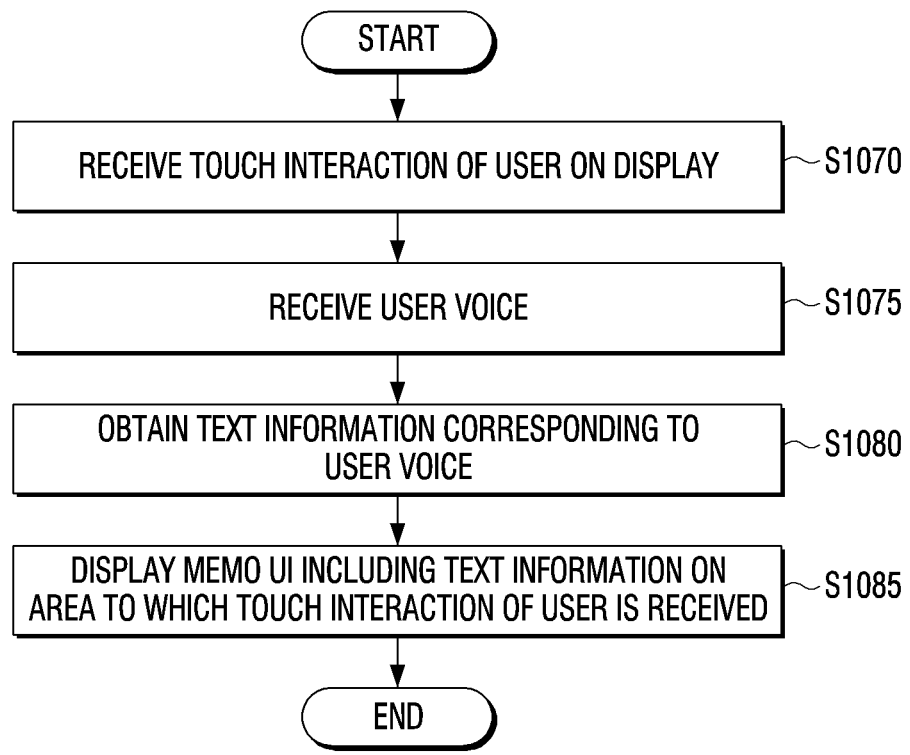
FIG. 10B is a diagram illustrating an embodiment of displaying a memo UI on an area to which a touch interaction of a user is received on a display.

FIG. 10B is a diagram illustrating an embodiment of displaying a memo UI on an area to which a touch interaction of a user is received on a display.

As illustrated in FIG. 10B, the electronic device 100 may receive the touch interaction of the user on the display (S1070). Specifically, the electronic device 100 may receive the touch interaction of the user on one area from among the areas on the display. Here, the touch interaction of the user may be touch interactions of various types as described above with reference to FIGS. 7A to 7C.

The electronic device 100 may receive the user voice (S1075). Then, when the user voice is received, the electronic device 100 may obtain text information corresponding to the user voice (S1080). Here, the user voice which is the subject of voice recognition may be specified based on the touch interaction of the user.

Specifically, the point in time in which the touch interaction of the user is received may be the starting point for specifying the user voice which is the subject of voice recognition. That is, when the touch interaction of the user which is pre-set as corresponding to the trigger input is received on the display, the electronic device 100 may perform voice recognition on the received user voice after the touch interaction of the user is received, and obtain text information corresponding to the user voice.

Here, whether or not the touch interaction of the user is maintained until the point in time the user voice is starting to be received is not an issue. However, if the touch interaction of the user is maintained even after the point in time at which the user voice is starting to be received, the point in time at which the touch interaction of the user is received becomes the starting point for specifying the user voice which is the subject of voice recognition, and the point in time at which the touch interaction of the user ends may be the end point for specifying the user voice which is the subject of voice recognition as described above with reference to FIG. 2.

The electronic device 100 may display the memo UI including text information on the area in which the touch interaction of the user is received (S1085). That is, in the above, according to an embodiment of the disclosure as described above with reference to FIG. 10B, the electronic device 100 may without performing at least some from among the process of obtaining an image including the at least one object, the process of identifying the at least one object included in the obtained image, the process of identifying the object corresponding to the user voice based on text information corresponding to the user voice, and the process of displaying the obtained image on the display, and display the memo UI on the area in which the touch interaction of the user is received.

According to an embodiment as described above with reference to FIG. 10B, the user of the electronic device 100 may, without considering the relationship with the image including the at least one object, display the memo UI on an area in which the user desires to display the memo UI based on the touch interaction of the user. Specifically, the user voice which is the subject of voice recognition may be specified concurrently as the area in which the memo UI is displayed is determined based on a one time touch interaction of the user.

Figure 11B:
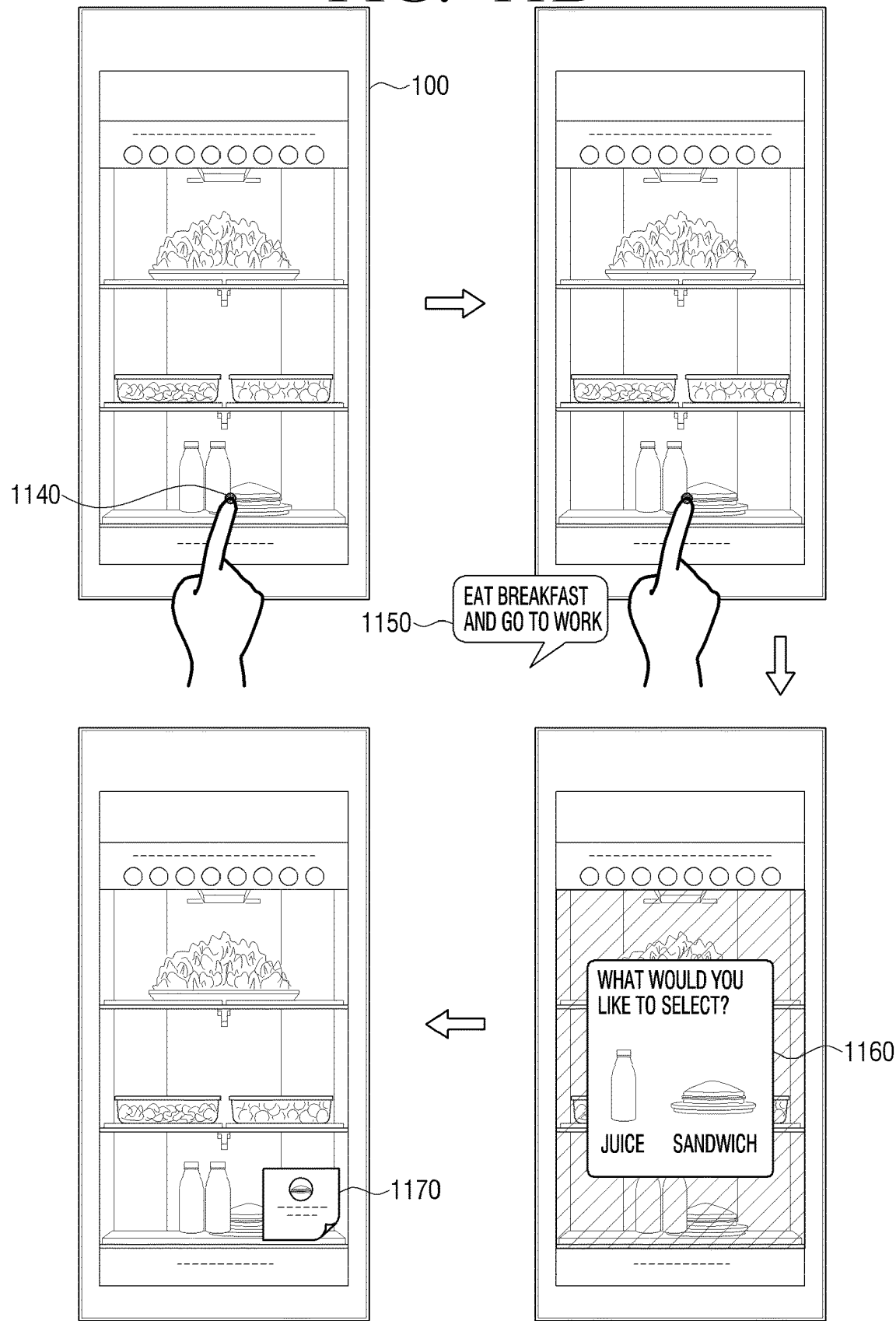

FIGS. 11A and 11B are diagrams illustrating in detail an embodiment related to providing a selecting UI when there are two or more identified objects which correspond to a user voice.

As described above, based on the electronic device 100 being a refrigerator as illustrated in FIGS. 11A and 11B, the electronic device 100 may obtain an inside image of the refrigerator by capturing the inside of the refrigerator, and identify "juice," "sandwich," and the like as the at least one object included in the obtained image.

Meanwhile, as described above, the electronic device 100 may identify the object corresponding to the received user voice from among the at least one object included in the image. Then, based on there being two or more identified objects as corresponding to the user voice, the electronic device 100 may display the selecting UI including information on the two or more objects on the display. Here, the selecting UI may refer to the user interface for receiving the user input which selects one from among the two or more objects.

Based on the user input selecting the one object from among the two or more objects being received through the selecting UI, the electronic device 100 may identify the selected one object as the object corresponding to the user voice. Here, the various embodiments related to providing the selecting UI according to the disclosure will be described in detail below with reference to FIGS. 11A and 11B.

FIG. 11A is a diagram illustrating an embodiment related to providing the selecting UI when there are two or more objects identified as corresponding to the user voice based on identifying the object corresponding to the received user voice from among the at least one object included in the image based on the text information corresponding to the user voice.

Referring to FIG. 11A, the electronic device 100 may receive the user voice, and obtain text information such as "eat sandwich and juice and go to work" 1110 as text information corresponding to the received user voice. When the text information corresponding to the user voice is obtained, the electronic device 100 may identify objects such as "juice" and "sandwich" as objects corresponding to the user voice from among the at least one object included in the image. In this case, because there are two or more identified objects, the electronic device 100 may provide the selecting UI 1120 including text information on the two or more objects such as "juice" and "sandwich" on the display.

When a user input of selecting an object such as "sandwich" from among the "juice" and "sandwich" is received through the selecting UI 1120, the electronic device 100 may identify the object such as "sandwich" as the object corresponding to the received user voice. Then, the electronic device 100 may display the memo UI 1130 including text information such as "each sandwich and juice and go to work" on the area corresponding to "sandwich" from among the areas on the display.

FIG. 11B is a diagram illustrating an embodiment related to providing the selecting UI when there are two or more identified objects as corresponding to the user voice based on identifying the object corresponding to the received user voice from among the at least one object included in the image based on the touch interaction of the user.

Referring to FIG. 11B, the electronic device 100 may receive the user voice, and obtain text information such as "eat breakfast and go to work" 1150 as text information corresponding to the received user voice. Then, as illustrated in FIG. 11B, the electronic device 100 may receive the touch interaction of the user on the display. When the touch interaction of the user is received, the object corresponding to the area in which the touch interaction of the user is received from among the areas on the display may be identified as the object corresponding to the user voice. Specifically, when objects such as "juice" and "sandwich" are displayed on the display in the area within the pre-set distance from the point at which the touch interaction of the user is received, the electronic device 100 may identify "juice" and "sandwich" as objects corresponding to the user voice.

In this case, because there are two or more identified objects, the electronic device 100 may, as described with reference to FIG. 11A, provide the selecting UI 1160 including information on two or more objects such as "juice" and "sandwich" on the display, and when the user input of selecting the object such as "sandwich" is received through the selecting UI 1160, the electronic device 100 may display the memo UI 1170 including text information such as "eat this and go to work" on the area corresponding to "sandwich" from among the areas on the display.

According to the various embodiments of the disclosure as described above, the electronic device 100 may, when there are two or more objects identified as corresponding to the user voice, display the memo UI on an area of the display that corresponds to the user intent by allowing the user to select the object through the selecting UI.

Meanwhile, in the above, the embodiment of providing the selecting UI when two or more objects are identified based on text information assuming that the touch interaction has not been received, and when two or more objects are identified based on the touch interaction assuming that information on the object is not included in the text information has been described in each of FIGS. 11A and 11B, respectively.

However, according to an embodiment of the disclosure, the object corresponding to the user voice may be identified based on the text information, and the object corresponding to the user voice may also be identified based on the touch interaction. In this case, the electronic device 100 may determine the area at which the memo UI is to be displayed without providing the selecting UI.

For example, when two objects such as "juice" and "sandwich" are identified based on the text information, if one object such as "juice" is identified based on the touch interaction, the electronic device 100 may display the memo UI on the area corresponding to "juice" which is the one object identified based on the touch interaction without providing the selecting UI. In addition, when two objects such as "juice" and "sandwich" are identified based on the touch interaction, if the object such as "sandwich" is identified based on the text information, the electronic device 100 may display the memo UI on the area corresponding to "sandwich" which is one object identified based on the text information without providing the selecting UI.

Figure 12:
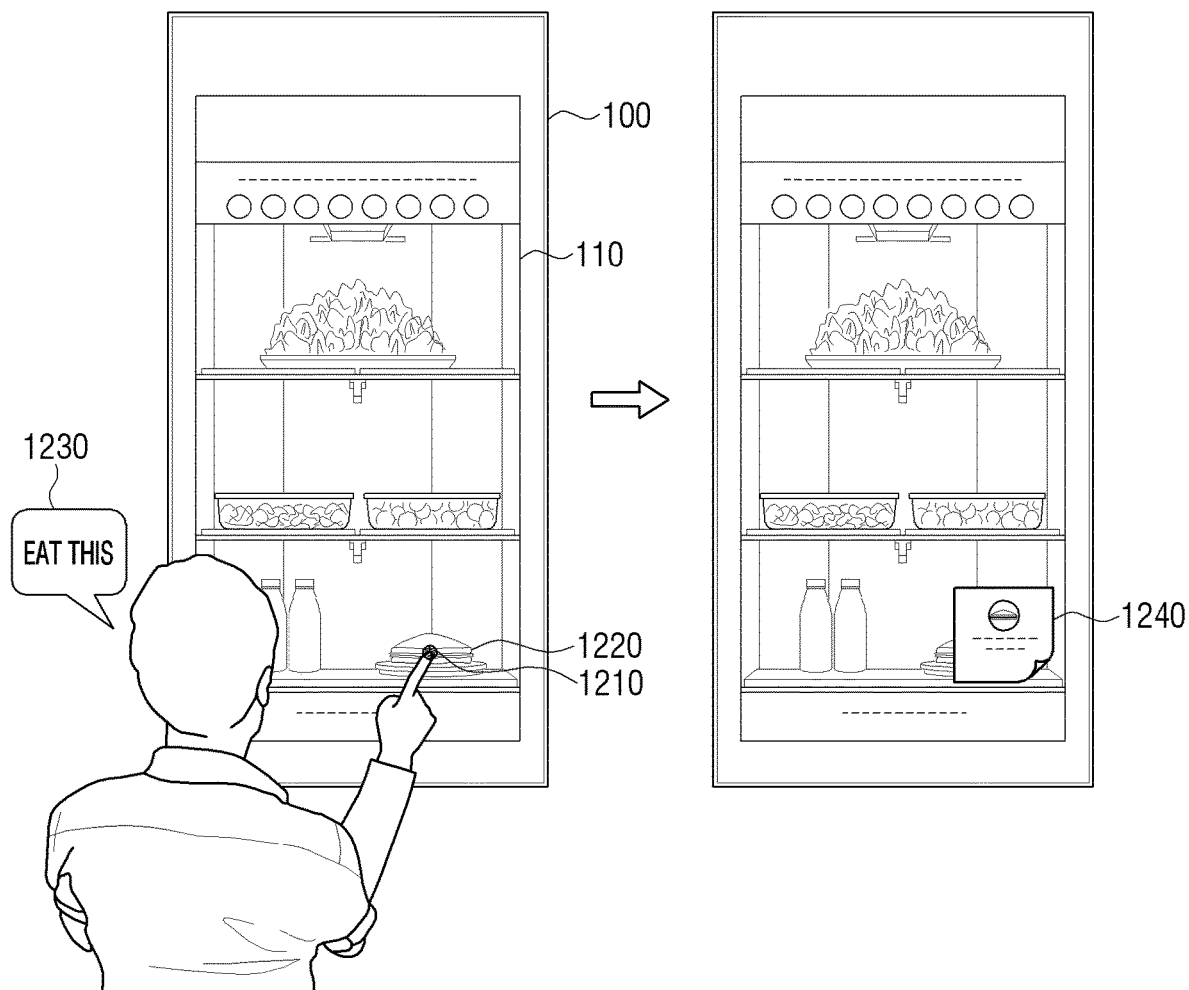
FIG. 12 is a diagram illustrating an embodiment related to a pronoun being included in text information corresponding to a user voice.

FIG. 12 is a diagram illustrating an embodiment related to a pronoun being included in text information corresponding to a user voice.

In the above, information on the at least one object included in the image being included in the text information corresponding to the user voice has been described, but a pronoun may be included in the obtained text information. For example, as illustrated in FIG. 12, the electronic device 100 may obtain text information such as "eat this" 1230 as text information corresponding to the received user voice. In this case, the obtained text information may include the pronoun such as "this."

Meanwhile, because the pronoun is a word which represents a name of a person or an object in place thereof, based on the pronoun being included in the text information, if the pronoun is changed to the name of the person or the object in accordance with the uttering intent of the user and displayed through the memo UI, the uttering intent of the user will be more effectively transferred to the other person.

Accordingly, according to an embodiment of the disclosure, if a pronoun is included in the text information corresponding to the user voice, the electronic device 100 may obtain text information in which the pronoun is changed to the name of the object identified as corresponding to the user voice. Here, the object corresponding to the user voice may be identified based on the touch interaction of the user received on the display 110 as described above. Then, when the changed text information is obtained, the electronic device 100 may display the memo UI including the changed text information on the area corresponding to the object identified as corresponding to the user voice.

For example, as illustrated in FIG. 12, the electronic device 100 may identify "sandwich" 1220 which is the object corresponding to the area in which the touch interaction 1210 is received from among the areas on the display 110 as the object corresponding to the user voice. Then, when the pronoun such as "this" is included in the obtained text information, the electronic device 100 may, by changing "this" to "sandwich" which is the name of the object identified as corresponding to the user voice, obtain changed text information such as "eat the sandwich." Then, based on the changed text information being obtained, the electronic device 100 may display the memo UI 1240 including text information such as "eat the sandwich" which is the changed text information on the area corresponding to the identified object.

According to the various embodiments of the disclosure as described above, the electronic device 100 may, based on a pronoun being included in the text information corresponding to the user voice being included, generate text information through voice recognition and further improve the convenience of the user intended for display by providing the memo UI which reflects the user intent according the touch interaction of the user.

Figure 13A:
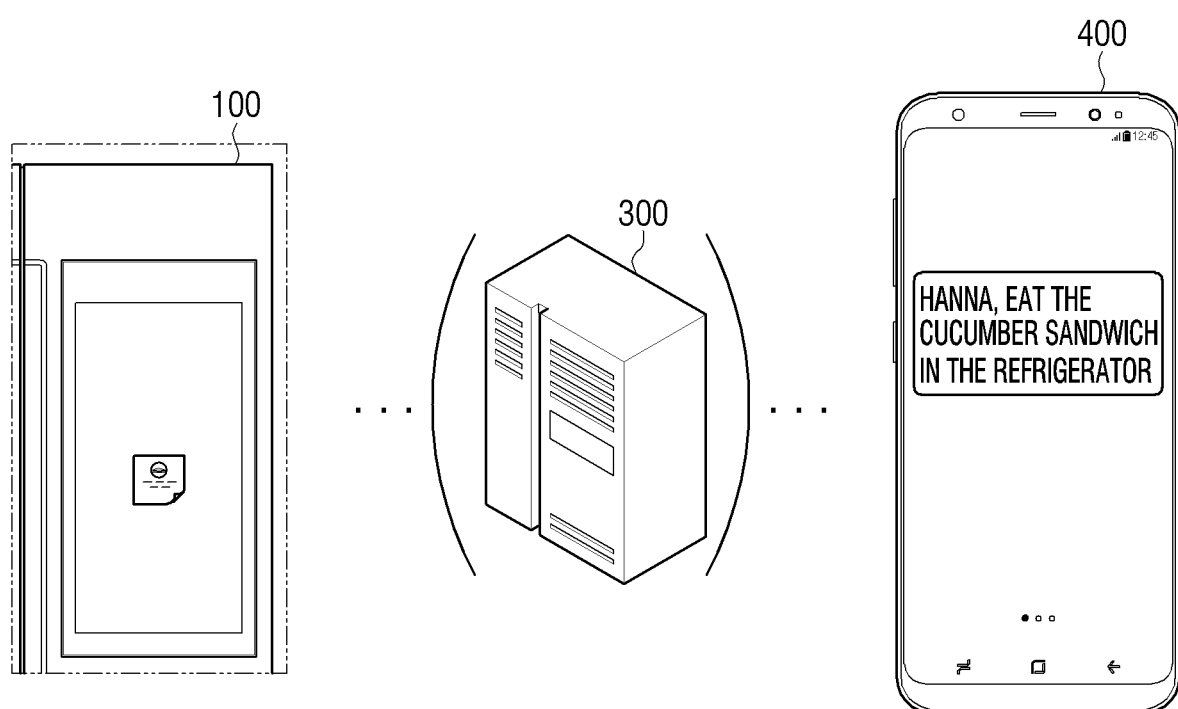
FIG. 13A is a diagram illustrating an embodiment related to information on a user name being included in text information corresponding to a user voice.

FIG. 13A is a diagram illustrating an embodiment related to information on a user name being included in text information corresponding to a user voice.

In the above, the various embodiments according to the disclosure focused on information on the at least one object included in the image being included in the text information corresponding to the user voice have been described, but information on the name of the user that is pre-stored may be included in the text information corresponding to the user voice. For example, as illustrated in FIG. 13A, the electronic device 100 may obtain text information including a user name such as "Hanna" which is the user name that is pre-stored as text information corresponding to the received user voice.

When the name of the user that is pre-stored is included in the text information corresponding to the user voice, the electronic device 100 may transmit the text information to a user terminal 400 corresponding to the user name. Specifically, the electronic device 100 may store the user name and information on the user terminal 400 corresponding to the user name. Then, when the name of the user that is pre-stored is included in the text information corresponding to the user voice, the electronic device 100 may transmit text information corresponding to the user voice to the user terminal 400 that corresponds to the user name. As illustrated in FIG. 13A, the text information corresponding to the user voice may be directly transmitted to the user terminal 400, or may be transmitted through an external server 300.

For example, as illustrated in FIG. 13A, the electronic device may not only display the memo UI including text information corresponding to the user voice on the display of the electronic device 100, but also directly transmit or through the external server 300 the text information corresponding to the user voice to the user terminal 400 which corresponds to the user name of "Hanna."

Meanwhile, the electronic device 100 may not only transmit text information corresponding to the user voice to the user terminal 400 corresponding to the user name included in the text information, but also transmit the information on the user who uttered the user voice. Here, the user who uttered the user voice may be identified based on a voice print analysis of the user voice as described above in the description on FIGS. 9A and 9B or an object recognition on the user image obtained through the camera. Then, information on the identified user may be pre-stored in the electronic device 100, and information on the name of the user may be included. In the example as described above, if the user who uttered the user voice is identified as "Tommy," the electronic device 100 may transmit the information that the user who uttered the user voice is "Tommy" together with text information corresponding to the user voice to the user terminal 400 which corresponds to the user name "Hanna."

Meanwhile, in the above, the embodiment of providing notification to the user by the electronic device 100 transmitting text information corresponding to the user voice to the user terminal 400 has been described, but the notification as described above may be provided to the user through the electronic device 100. Specifically, if the user corresponding to the user name included in the text information is identified as located within the pre-set distance from the electronic device 100, the electronic device 100 may provide the notification to the user through the electronic device 100.

Specifically, the electronic device 100 may identify that the user corresponding to the user name included in the text information is located within the pre-set distance from the electronic device 100 based on the voice print analysis of the user voice or the object recognition on the user image obtained through the camera as described in the descriptions on FIGS. 9A and 9B above. Then, if it is identified that the user is located within the pre-set distance from the electronic device 100, the electronic device 100 may change the color, form, or the like of the memo UI displayed on the display or light up the indicator to guide the user to check the memo UI, and may output a voice requesting to the user that the memo UI be checked through the speaker.

According to the various embodiments of the disclosure as described above, the electronic device 100 may, based on information on the user name being included in the text information corresponding to the user voice, further improve the user convenience by transmitting the notification to the user terminal corresponding to the user name.

Figure 13B:
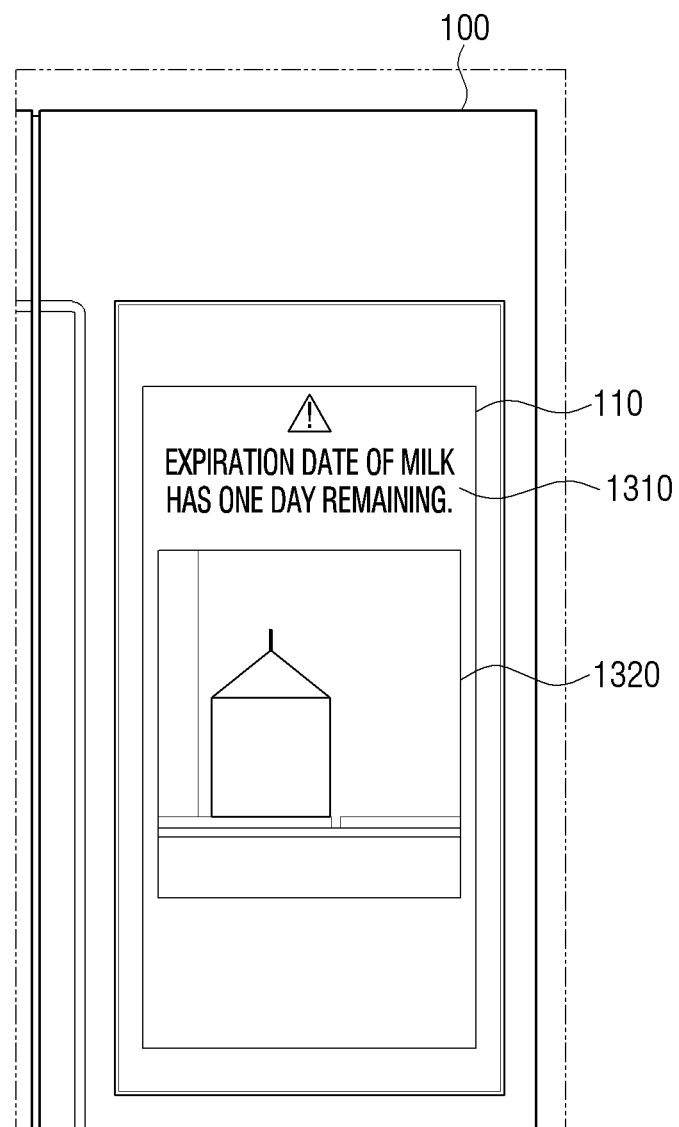
FIG. 13B is a diagram illustrating an embodiment related to information on a duration of an object being included in text information corresponding to a user voice.

FIG. 13B is a diagram illustrating an embodiment related to information on a duration of an object being included in text information corresponding to a user voice.

In the text information corresponding to the user voice, information on a duration of an object may be included. Further, if information on the duration of the object is included in the text information corresponding to the user voice, the electronic device 100 may provide a notification related to the duration of the object Here, the notification related to the duration of the object may be provided not only through the display 110, the speaker, and the like of the electronic device 100, but also provided through a display, a speaker, and the like of a user terminal connected with the electronic device 100.

For example, if the text information corresponding to the user voice is "drink the milk in the refrigerator by today" and if information on the duration of the object such as "by today" is included in the text information corresponding to the user voice, the electronic device 100 may display the notification related to the duration of the object on the display 110. Specifically, as illustrated in FIG. 13B, the electronic device 100 may display the notification related to the duration of the object such as "expiration date of milk has one day left" 1310 on the display 110, and may display an image 1320 related to "milk" in addition thereto.

Meanwhile, if the information on the duration of the object is included in the text information corresponding to the user voice, the electronic device 100 may provide a notification related to the duration of the object at a pre-set time interval until the point in time at which it corresponds to the information on the duration of the object. For example, if the text information in the user voice is "drink the milk in the refrigerator by today," the electronic device 100 may provide a notification related to the duration of the object such as "the expiration date of milk has n hours remaining" at hourly intervals until midnight of the date the text information corresponding to the user voice is obtained. That is, if the electronic device 100 is a refrigerator and the object included in the text information corresponding to the user voice is a food product inside the refrigerator, the electronic device 100 may provide a notification related to a freshness of the food product.

Meanwhile, the electronic device 100 may provide notifications related to a duration of an object using different methods according to the distance between the point in time at which the notification is provided and the point in time corresponding to the information on the duration of the object. For example, if the text information corresponding to the user voice is "drink the milk in the refrigerator by tomorrow," the electronic device 100 may provide a notification related to the duration of the object by displaying the memo UI through the display 110 of the electronic device 100 at the point in time at which the text information corresponding to the user voice is obtained, and after three hours, provide a notification related to the duration of the object by displaying the memo UI in a color that is different from that of three hours prior, and after another three hours, provide a notification related to the duration of the object through the display of the user terminal, and after another three hours, provide a notification related to the duration of the object through the display of the user terminal while concurrently output a voice related to the duration of the object through the speaker.

Here, providing a notification related to the duration of the object through the user terminal may mean the electronic device 100 transmitting information on the notification related to the duration of the object to the user terminal, and the user terminal providing the notification related to the duration of the object in the user terminal based on information on the notification related to the duration of the object received from the electronic device 100.

Meanwhile, if the first object from among the at least one object included in the first image is identified as the object corresponding to the user voice, and if information on the duration of the first object is included in the text information corresponding to the user voice, the electronic device 100 may obtain the second image, and provide a notification related to the duration of the object only when the first object is identified in the obtained second image.

Here, the second image may refer to an image obtained by capturing the same location as the first image after the first image is obtained. The point in time at which the second image is obtained may be the point in time after a pre-set time from the point in time at which the first image is obtained. The first image and the second image may be obtained by capturing the same location according to the pre-set time interval, and furthermore obtained by capturing the same location based on a pre-set event occurring.

For example, based on the electronic device 100 being a refrigerator, the first image may be an image obtained by capturing a specific location inside the refrigerator. In this case, "milk" included in the first image may be identified as the object corresponding to the user voice, and if information on the duration of "milk" is included in the text information corresponding to the user voice, the electronic device 100 may obtain the second image by capturing the location which is captured when obtaining the first image. Then, the electronic device 100 may provide a notification related to the duration of the object only when "milk" is identified in the obtained second image.

Meanwhile, even after the point in time corresponding to the information on the duration of the object has passed, if an object corresponding to the user voice is present, the electronic device 100 may provide a notification different from that of the previous prior to the point in time corresponding to information on the duration of the object passing as a notification related to the duration of the object. For example, if the text information corresponding to the user voice is "drink the milk in the refrigerator by today," and if "milk" is present even after midnight of the day the text information corresponding to the user voice is obtained, the electronic device 100 may also provide a notification such as "milk in the refrigerator must be thrown out."

Meanwhile, in the above, information on the duration of the object may not only be included clearly in the text information corresponding to the user voice, but may also be obtained based on information on at least one object included in the text information. For example, if information on the object "milk" is included in the information corresponding to the user voice, the electronic device 100 may obtain information on the duration of the object that the consumption duration of "milk" is 5 days based on information on the consumption duration per each pre-stored object, and provide the notification related to the duration of the object.

According to the various embodiments of the disclosure as described above, the electronic device 100 may, if information of the duration of the object is included in the text information corresponding to the user voice, further improve user convenience by providing notifications related to the duration of the object in various methods.

Figure 13C:
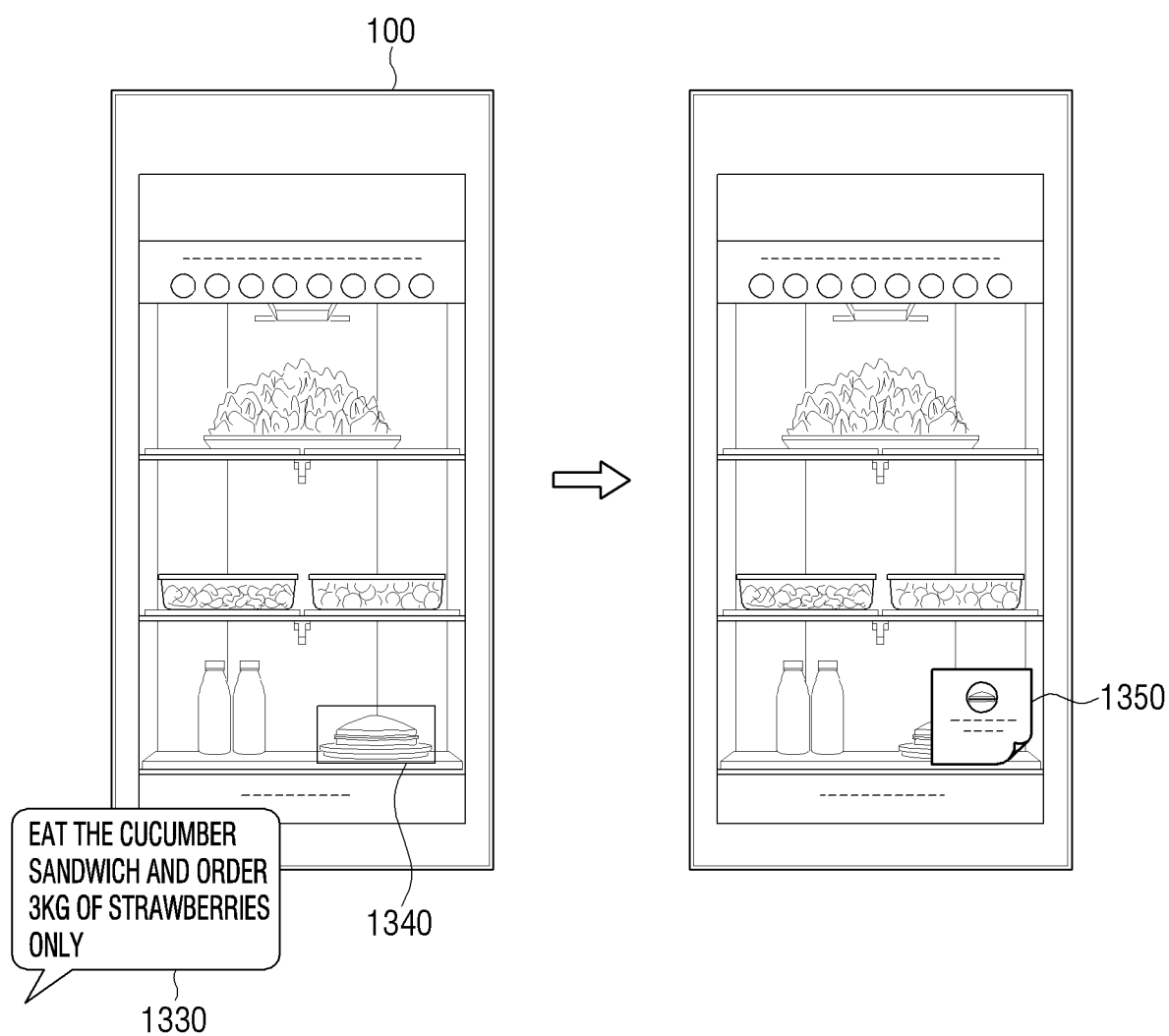
FIG. 13C is a diagram illustrating an embodiment related to information on a user intent being included in text information corresponding to a user voice.

FIG. 13C is a diagram illustrating an embodiment related to information on a user intent being included in text information corresponding to a user voice.

In the above, the various embodiments according to the disclosure have been described focusing on information on at least one object included in the image being included in the text information corresponding to the user voice, but information on a user intent may also be included in the text information corresponding to the user voice. Further, the information on the user intent may be obtained through the NLU module as described above with reference to FIG. 3B.

As described above, the NLU module may perform a syntactic analysis and a semantic analysis on the text information corresponding to the user voice, and obtain information of the user intent.

Specifically, the NLU module classifies a grammatical unit (e.g., word, phrase, morpheme, etc.) of the obtained text information, and identifies which grammatical element the classified grammatical unit includes. Then, the NLU module may determine the meaning of the text information based on the identified grammatical elements. In addition, the NLU module may obtain information on the user intent by matching the meaning of the determined text information with an identified domain, a plurality of intent which is included in the identified domain, and a plurality of parameters or slots. For example, by matching the meaning of the determined text with "alarm" which is the identified domain and "set alarm" and "cancel alarm" which is the plurality of intent included in the identified domain, and by matching "time" which is a parameter necessary in expressing the user intent to the "number of times repeated," "alarm sound," and the lie, the information on the user intent may be obtained.

As described above, if information on the user intent is obtained through the NLU module, the electronic device 100 may perform an operation related to the user intent. Specifically, if information on the user intent is included in the text information corresponding to the user voice, the electronic device 100 may identify an application capable of performing the operation related to the user intent, and perform an operation related to the user intent through the identified application. The embodiment with respect to the above has been described below with reference to examples as illustrated in FIG. 13C.

As described previously, based on the electronic device 100 being a refrigerator, the electronic device 100 may obtain an inside image of the electronic device 100, and identify "cucumber sandwich" 1340 as the at least one object included in the obtained image. In addition, the electronic device 100 may receive the user voice, perform voice recognition on the received user voice, and obtain text information 1330 such as "eat the cucumber sandwich and order 3*kg* of strawberries only" as text information corresponding to the user voice.

Then, the electronic device 100 may, as the object corresponding to the user voice from among the at least one object included in the image, identify the "cucumber sandwich" 1340, and display the memo UI 1350 including text information such as "eat the cucumber sandwich and order 3*kg* of strawberries only" on the area corresponding to "cucumber sandwich" 1340 from among the areas of the display.

Meanwhile, the electronic device 100 may perform natural language understanding on the obtained text information, and obtain information on the user intent such as "order 3 kg of strawberries." In this case, the electronic device 100 may identify a shopping application as an application related to the user intent of ""order 3 kg of strawberries" from among the applications stored in the electronic device, and add the "3 kg of strawberries" to a shopping list provided through the shopping application.

Meanwhile, if information on the user intent is included in the text information corresponding to the user voice, the object corresponding to the user intent may not only be identified based on the text information corresponding to the user voice as illustrated in FIG. 13C, but also be identified based on the touch interaction of the user. For example, if information on the user intent such as "must buy" and "add to" is included in the text information corresponding to the user voice, and if the touch interaction of the user is received on an area corresponding to "strawberry" from among the areas on the display, the electronic device 100 may obtain information on the user intent such as "order strawberries." Then, the electronic device 100 may identify a shopping application as the application related to the user intent of "order strawberries," and add the "strawberry" to the shopping list provided through the shopping application. According to the embodiment as described above, the electronic device 100 may, based on information of the user intent being included in the text information corresponding to the user voice, further improve user convenience by additionally providing a function related to the user intent in addition to providing the memo UI.

Figure 14:
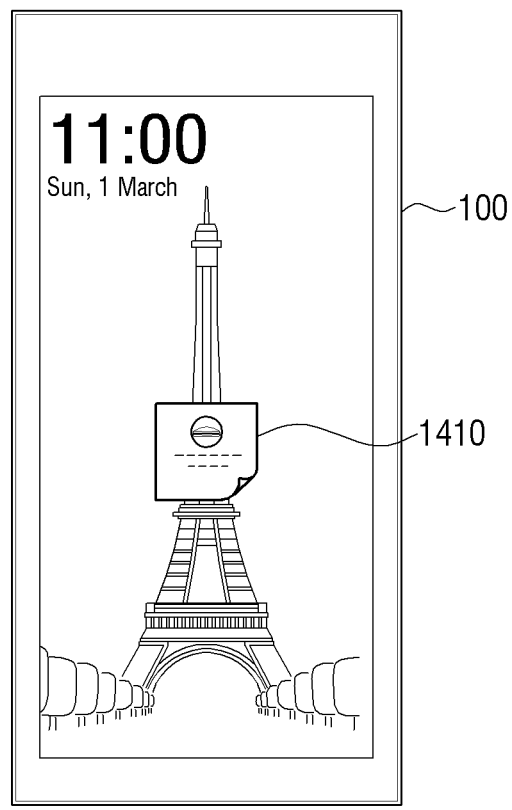
FIG. 14 is a diagram illustrating an embodiment related to displaying a memo UI on a home screen provided through an electronic device.

FIG. 14 is a diagram illustrating an embodiment related to displaying a memo UI on a home screen provided through an electronic device 100.

In the above, the embodiment of displaying the memo UI on the area corresponding to the object identified as corresponding to the user voice from among the areas of the display has been described, but the area in which the memo UI according to the disclosure is displayed in not limited thereto, and may be displayed on various UI areas provided by the operating system (O/S) of the electronic device 100.

For example, based on the electronic device 100 being a smart phone, the memo UI according to the disclosure may be displayed as a memo UI 1410 of a widget form on a home screen of the smart phone as illustrated in FIG. 14. In addition thereto, the memo UI may also be displayed on a notification bar, a locked screen, or the like of the smart phone.

Meanwhile, based on the memo UI being displayed on various UI areas as described above, the size and form of the UI may be varied according to the area in which the memo UI is to be displayed.

Figure 15A:
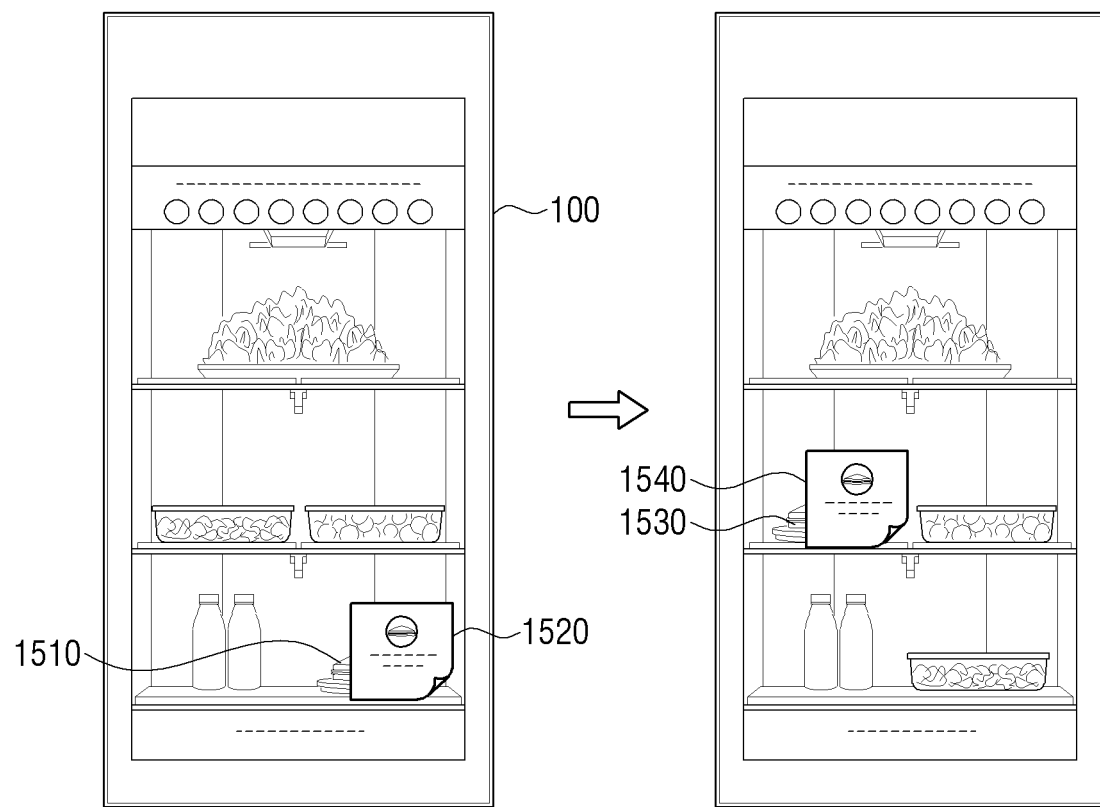
FIGS. 15A and 15B are diagrams illustrating an embodiment related to a position of an object corresponding to a user voice being moved or having disappeared.
Figure 15B:
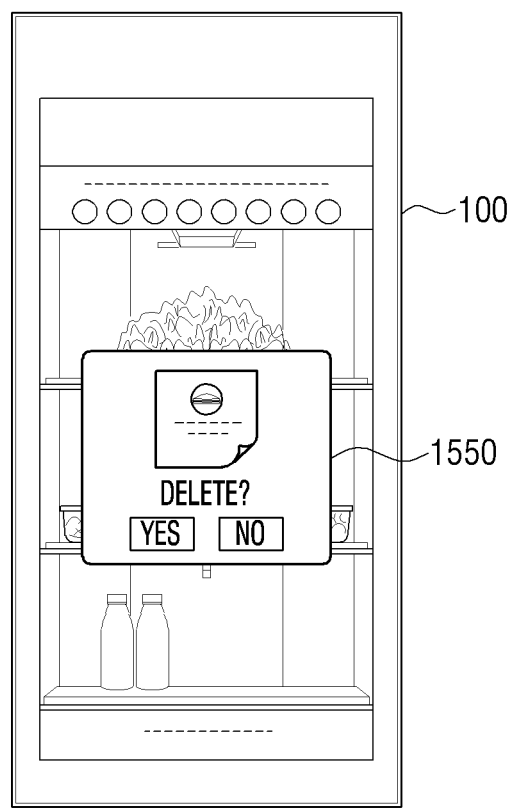

FIGS. 15A and 15B are diagrams illustrating an embodiment related to a position of an object corresponding to a user voice being moved or having disappeared.

As described above, the electronic device 100 according to the disclosure may display the memo UI including text information which corresponds to the user voice on the area corresponding to the object identified as corresponding to the user voice from among the areas on the display.

However, the location of the object identified as corresponding to the user voice may be moved after the memo UI according to the disclosure is displayed. Here, the movement of the object identified as corresponding to the user voice may be identified by comparing the location of the object identified as corresponding to the user voice within the first image obtained prior to the memo UI according to the disclosure id displayed and the location of the object identified as corresponding to the user voice within the second image obtained after the memo UI is displayed.

Here, the second image may be the image obtained by capturing the same location as with the first image after the first image is obtained. Then, the first image and the second image may be obtained by capturing the same location according to the pre-set time interval, and further the first image and the second image may also be obtained by capturing the same location based on a pre-set event occurring. For example, based on the electronic device 100 being a refrigerator, the electronic device 100 may obtain the first image by capturing a specific location inside the refrigerator when a pre-set event occurring such as the operation of a door of the refrigerator opening and closing, and obtain the second image by capturing the captured location when obtaining the first image if the pre-set event occurs again such as the operation of the door of the refrigerator opening and closing after the first image is obtained.

Meanwhile, the location of the object identified as corresponding to the user voice within the first image and the second image may be identified based on at least one from among a coordinate value of a center point of an object within the image, a coordinate value of a feature point, and a coordinate value of text information.

Based on the movement of the object corresponding to the user voice being identified, the electronic device 100 may display the memo UI on the area corresponding to the location of the object which is moved from among the areas on the display. Specifically, the electronic device 100 may delete the memo UI which was displayed on the area corresponding to the location prior to the object corresponding to the user voice being moved from among the areas on the display, and display a memo UI on an area corresponding to the location the object corresponding to the user voice is moved from among the areas of the display.

For example, as illustrated in FIG. 15A, the electronic device 100 may delete the memo UI 1520 which was displayed on the area corresponding to the location 1510 prior to the "sandwich" being moved which is the object corresponding to the user voice from among the areas on the display, and display a memo UI 1540 on an area corresponding to the location 1530 of the "sandwich" which was moved from among the areas on the display.

Meanwhile, the object corresponding to the user voice may be deleted after the memo UI according to the disclosure is displayed. Here, the deletion of the object corresponding to the user voice may also be identified using the same method as the movement of the object as described above.

Based on the deletion of the object corresponding to the user voice being identified, the electronic device 100 may display a deleting UI 1550. Here, the deleting UI 1550 may refer to a user interface which allows the user to select whether or not to delete the memo UI displayed on the display. Then, when a user input selecting to delete the displayed memo UI is received through the deleting UI 1550, the electronic device 100 may delete the memo UI displayed on the display. In the above, the deleting of the memo UI may mean selecting so that the memo UI displayed on the display is not displayed on the display.

For example, as illustrated in FIG. 15B, when deleting of the object corresponding to the user voice is identified, the electronic device 100 may display the deleting UI 1550 including elements such as "delete?," "YES" and "NO" together with the image on the displayed memo UI on the display. Then, when a user input selecting to delete the displayed memo UI is received through the deleting UI 1550, the electronic device 100 may delete the memo UI displayed on the display.

According to the various embodiments of the disclosure as described above, the electronic device 100 may improve user experience even after the user voice is uttered by providing a user interface reflecting the movement and deletion of the object corresponding to the user voice.

Figure 16:
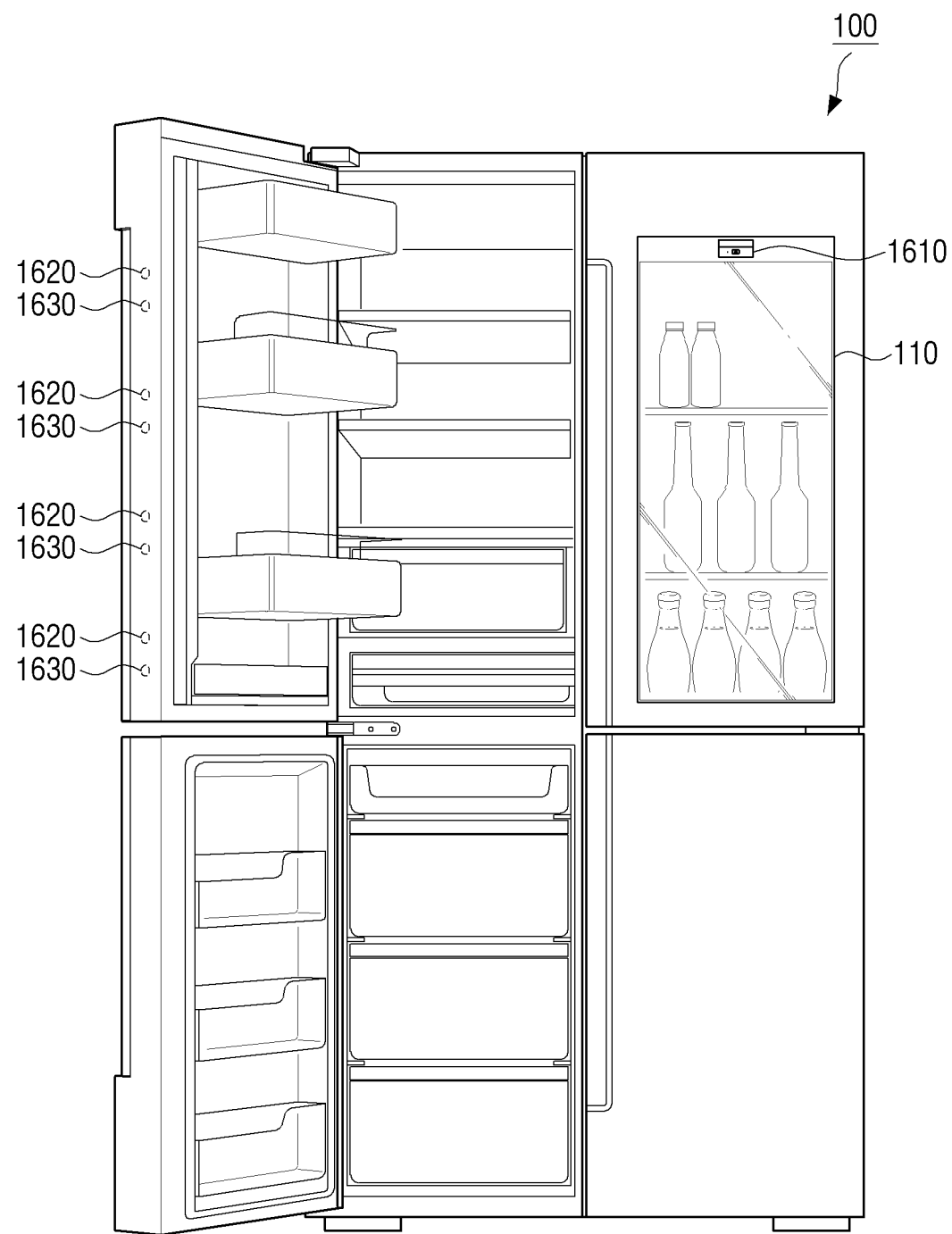
FIG. 16 is a diagram illustrating in brief a structure of a refrigerator related to the disclosure based on an electronic device according to the disclosure being a refrigerator.

FIG. 16 is a diagram illustrating in brief a structure of a refrigerator related to the disclosure based on an electronic device 100 according to the disclosure being a refrigerator.

As described above, the electronic device 100 according to the disclosure is not limited to an electronic device 100 of a specific type, but the electronic device 100 according to this specific disclosure may be a refrigerator. Further, as illustrated in FIG. 16, the refrigerator may include a display 110, a front camera 1610, inner cameras 1620 and 1630, and the like. In addition thereto, the refrigerator may include a main body including a cool air supplier, a storage container, a plurality of doors, a hinge which connects the plurality of doors with the main body, and the like, but configurations related to the embodiments of the disclosure will be focused on and described below.

The display 110 may output image data. Specifically, the display 110 may output an image pre-stored in the memory by the control of the processor. Specifically, the display 2110 according to the disclosure may display an image including at least one object by the control of the processor, and may display a user interface such as the memo UI, the selecting UI and the deleting UI.

Meanwhile, the display 110 according to the disclosure may be implemented as a transparent display. The transparent display may be implemented to include a transparent oxide semiconductor film and may have a transparent property, and accordingly, may display an object or an image arranged at the rear surface of the display 110. Specifically, based on the electronic device 100 according to the disclosure being a refrigerator, the display 110 may be implemented as a transparent display. Then, if the display 110 is implemented as a transparent display, the electronic device 100 may project the at least one object arranged inside the refrigerator on the transparent display or transmit through the transparent display, and display the image including the at least one object on the transparent display.

Meanwhile, the display 110 may be arranged at an outside of the at least one door from among the plurality of doors. Further, the display 110 may include both the transparent display 110 and a generic display 110. In addition, the display 110 may be arranged at a location adjacent with the speaker (not shown), and provide the user with an overall experience of a visual experience through the display 110 together with an auditory experience through the speaker.

The inner cameras 1620 and 1630 may capture the inside of the refrigerator. Specifically, the inner cameras 1620 and 1630 may include a camera 1620 according to the related art and a spectrum camera 1630 capable of obtaining a spectrum image. The inner cameras 1620 and 1630 may be arranged inside of the plurality of doors and capture the inside of the refrigerator as illustrated in FIG. 16, and accordingly, the electronic device 100 ma obtain the inside image of the refrigerator. Then, the inside image of the refrigerator obtained through the inner cameras 1620 and 1630 may be displayed on the display 110.

Meanwhile, a close proximity sensor may be arranged at the location adjacent to the inner cameras 1620 and 1630. Then, when an operation of at least one from among the plurality of doors opening and closing being detected through the proximity sensor, the electronic device 100 may capture a specific location inside the refrigerator through the inner cameras 1620 and 1630 and obtain an inside image of the refrigerator.

The front camera 1610 may capture an outside of the refrigerator. Specifically, the front camera 1610 may capture the outside of the refrigerator by being arranged at a location suitable for capturing the outside of the refrigerator like an upper part of the display 110, and accordingly, an outside image of the refrigerator may be obtained. Specifically, the front camera 1610 may capture the user outside of the refrigerator.

Then, when the user image is obtained through the front camera 1610, the electronic device 100 may perform object recognition on the user image obtained as described above and identify the user who uttered the user voice. Then, when the user who uttered the user voice is identified, the electronic device 100 may determine the size, the font, the color, and the like of the text information displayed through the memo UI differently according to the identified user, and also transmit the text information corresponding to the user voice to the user terminal of the identified user.

Figure 17:
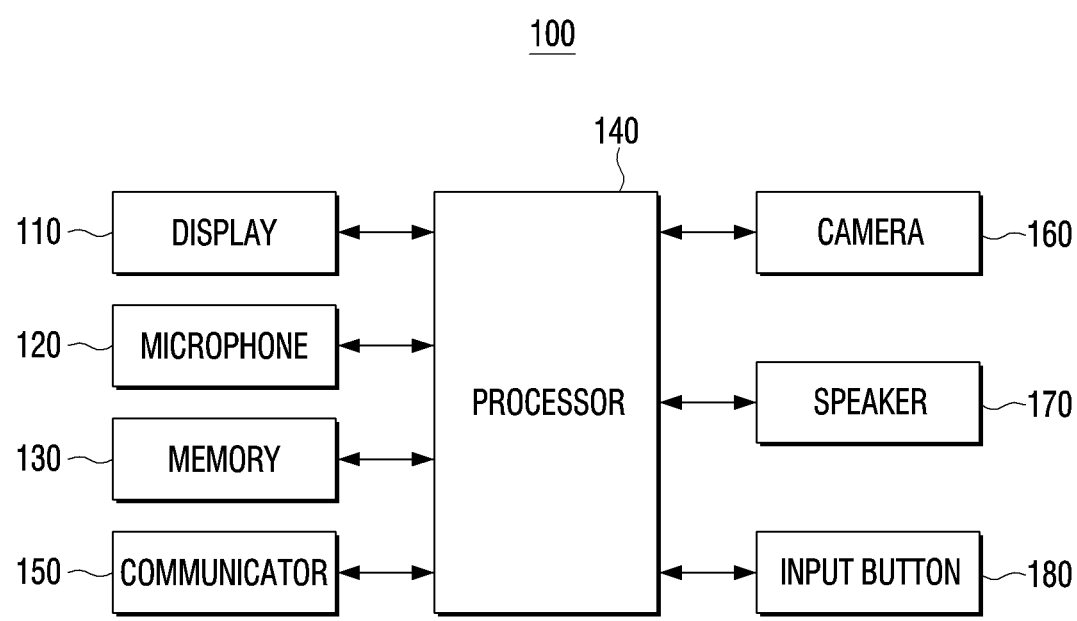
FIG. 17 is a block diagram illustrating in detail a configuration of an electronic device according to the disclosure.

FIG. 17 is a block diagram illustrating in detail a configuration of an electronic device 100 according to the disclosure.

As illustrated in FIG. 17, the electronic device 100 may not only include the microphone 120, the memory 130, and the processor 140, but also include a communicator 150, a camera 160, a speaker 170, an input button 180, and the like. However, the configurations such as the above are exemplary, and new configurations may be added in addition to the configurations described above or some configurations may be omitted in realizing the disclosure. Because the microphone 120, the display 110, the memory 130, and the processor 140 have been described above with reference to FIGS. 3A and 3B, the communicator 150, the camera 160, the speaker 170, and the input button 180 will be described below.

The communicator 150 comprises circuitry, and may perform communication with an external device. Specifically, the processor 140 may receive various data or information from the external device connected through the communicator 150, and transmit various data or information to the external device.

The communicator 150 may include at least one from among a WiFi module, a Bluetooth module, a wireless communication module, and a NFC module. Specifically, each of the WiFi module and the Bluetooth module may perform communication through a WiFi method and a Bluetooth method. When using the WiFi method or the Bluetooth method, various connection information such as SSID may first be transmitted and received, and various information may be transmitted and received after performing communication connection using the same.

In addition, the wireless communication module may perform communication according to the various communication standards such as, for example, and without limitation, IEEE, Zigbee, 3rd Generation (3G), 3rd Generation Partnership Project (3GPP), Long Term Evolution (LTE), 5th Generation (5G), or the like. Further, the NFC module may perform communication in a near field communication (NFC) method using a 13.56 MHz band from among various RF-ID frequency bands such as 135 kHz, 13.56 MHz, 433 MHz, 860-960 MHz, and 2.45 GHz.

Specifically, according to the disclosure, the processor 140 may be configured to control the communicator 150 to transmit at least one from among the obtained image and the received user voice to the external device, and receive at least one from among the information on the object included in the image and text information corresponding to the user voice from the external device through the communicator 150. In addition, based on the name of the user which is pre-stored in the text information corresponding to the user voice being included, the processor 140 may be configured to control the communicator 150 to transmit the text information to the user terminal corresponding to the user name.

The camera 160 may be arranged at the inside or outside of the electronic device 100, and capture an image on the inside or outside of the electronic device 100. Then, the processor 140 may obtain the image on the inside or the outside of the electronic device 100 through the camera 160. Specifically, based on the electronic device 100 according to the disclosure being a refrigerator, the processor 140 may not only obtain the an image of an inside of the refrigerator by capturing the inside of the refrigerator when a pre-set even occurs such as the operation of the door of the refrigerator opening and closing, but also obtain an image inside of the refrigerator by capturing the inside of the refrigerator at pre-set time intervals.

The speaker 170 may output sound. Specifically, the speaker 170 may output sound based on an audio data according to the disclosure by the control of the processor 140. Specifically, based on information on the duration being included in the text information corresponding to the user voice according to the disclosure, the processor 140 may be configured to output sound related to the information on the duration through the speaker 170. Then, the processor 140 may obtain a response voice on the user voice according to the disclosure, and output the obtained response voice through the speaker 170.

The input button 180 may receive user inputs of various types. Specifically, the input button 180 according to the disclosure may receive a trigger input for performing voice recognition. The trigger input may not only be received through the microphone 120 in the form of the user voice including the pre-set trigger word, but may also be received through the input button 180 arranged on the electronic device 100 so as to receive the trigger input. Here, the input button 180 may not only be a physical button arranged physically outside of the electronic device 100, but also a soft button implemented in the form of a UI that is displayed on a touch display 110.

Figure 18A:
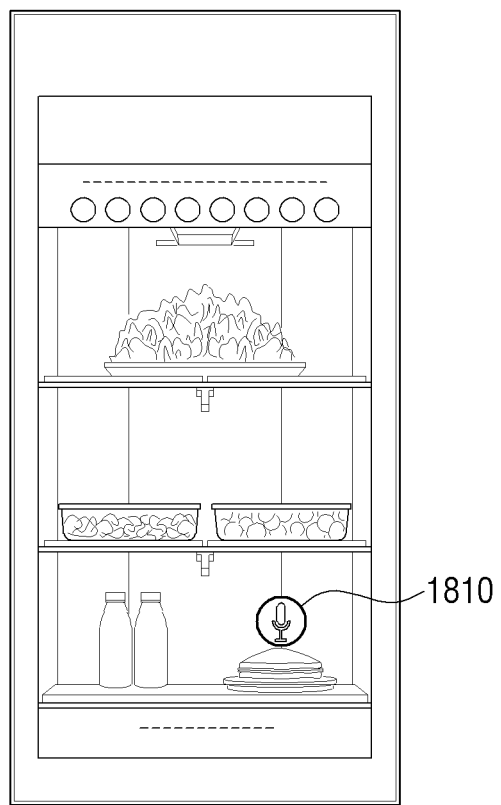
FIGS. 18A and 18B are diagrams illustrating an embodiment related to an indicator being provided according to the disclosure.
Figure 18B:
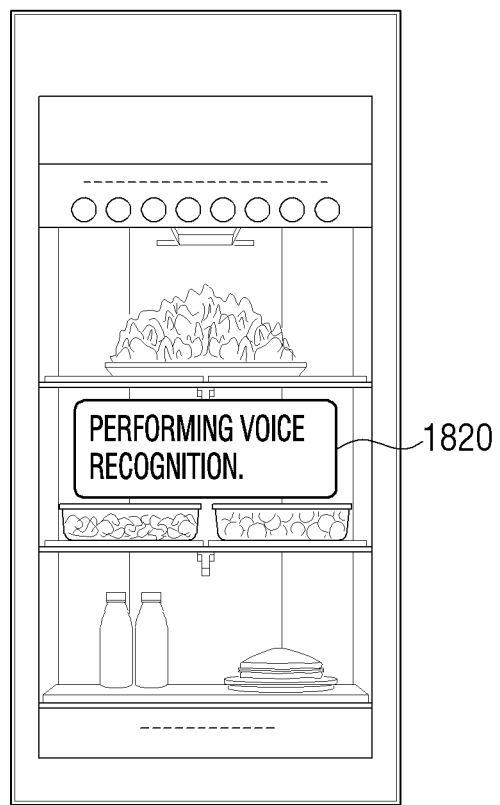

FIGS. 18A and 18B are diagrams illustrating an embodiment related to an indicator being provided according to the disclosure.

As described through FIG. 2, the received user voice may be the subject of voice recognition in its entirety, but only a portion from among the received user voice may be the subject of voice recognition. Here, the user voice which is the subject of voice recognition may be specified based on the pre-set starting point and the end point.

Specifically, according to an embodiment of the disclosure, the starting point and the end point for specifying the user voice which is the subject of voice recognition may be specified based on the touch interaction of the user received on the display. Specifically, the electronic device 100 may perform voice recognition on the received user voice from the point in time at which the pre-set touch interaction is received until the point in time at which the touch interaction of the user is ended as corresponding to the trigger input of the user on the display and obtain the text information corresponding to the user voice.

Meanwhile, while the touch interaction of the user is being maintained on the display, the electronic device 100 may display an indicator indicating that the user voice received while the indicator is being displayed is subject to voice recognition on the display. Specifically, when the touch interaction of the user is received on the display, the electronic device 100 may display the indicator indicating that the user voice which is received while the indicator is being displayed is subject to voice recognition, and when the touch interaction of the user received on the display is terminated, the displayed indicator may be deleted.

For example, the indicator according to the disclosure may be provided through a UI 1810 of a microphone shape as illustrated in FIG. 18A, and a message such as "voice recognition in progress" may be provided through the UI 1820 as illustrated in FIG. 18B.

As described above, when the indicator according to the disclosure is provided, the user of the electronic device 100 is able to grasp that the user voice received while the indicator is displayed is subject to voice recognition, and may perform utterance so as to correspond to the text information desired to be displayed through the memo UI. Accordingly, the electronic device 100 may display the memo UI corresponding to the user intent.

Figure 19:
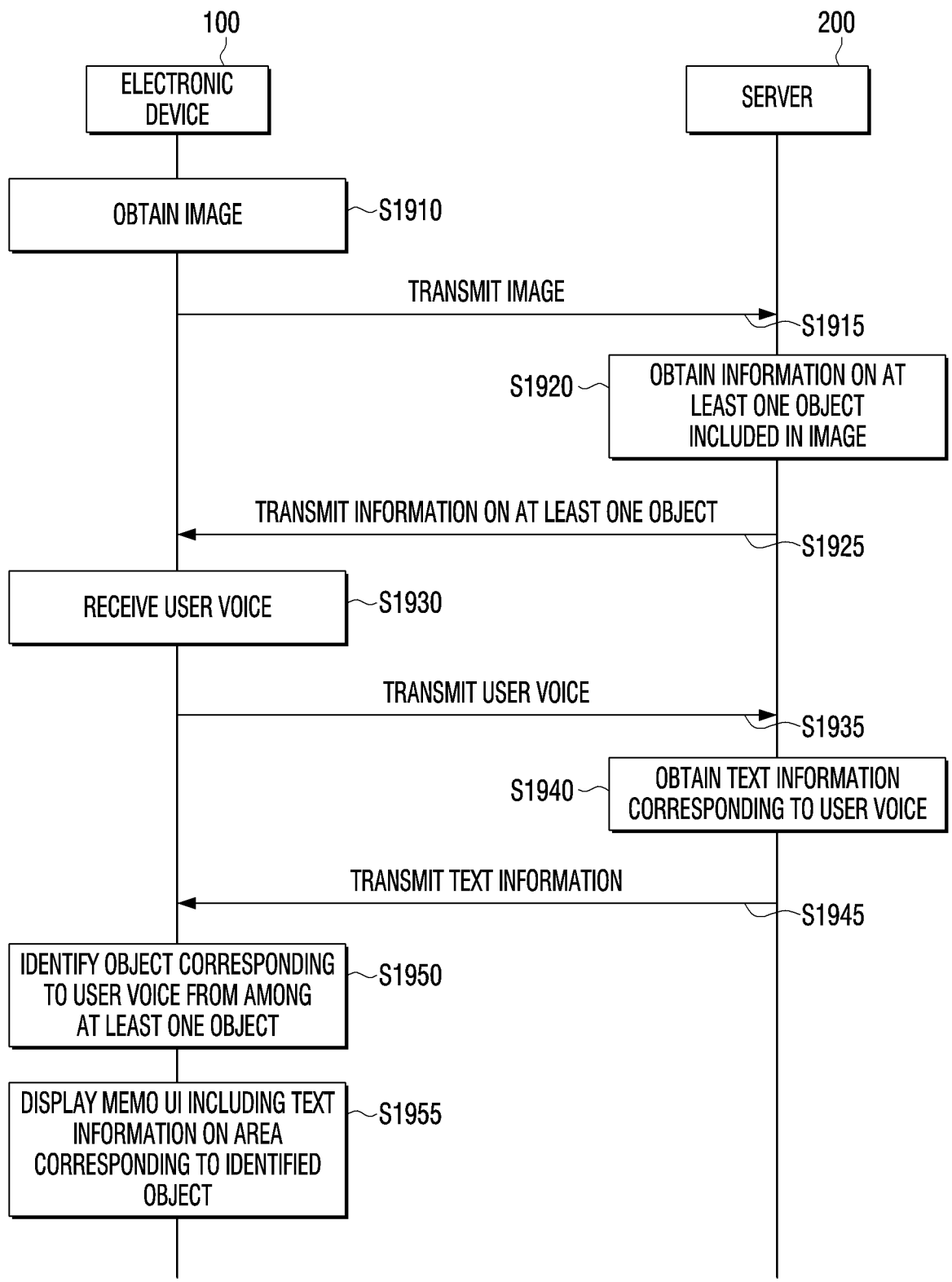
FIG. 19 is a diagram illustrating an embodiment of an object recognition and a voice recognition process according to the disclosure being performed through a server connected with an electronic device.

FIG. 19 is a diagram illustrating an embodiment of an object recognition and a voice recognition process according to the disclosure being performed through a server connected with an electronic device 100.

In the above, the various embodiments of the disclosure have been described assuming that processes according to the disclosure by the electronic device 100 are all performed in the electronic device 100, but the disclosure is not limited thereto. That is, at least some processes from among the processes according to the disclosure may be performed through the external device or the server. Specifically, at least one process from among the object recognition and voice recognition according to the disclosure may be performed through the object recognition module and/or the server including the ASR module.

The process of object recognition and voice recognition according to the disclosure being performed entirely through the server will be described below with reference to FIG. 19, but redundant descriptions which have been described above will be omitted.

The electronic device 100 may obtain an image including at least one object (S1910). When the image including the at least one object is obtained, the electronic device 100 may transmit the obtained image to the server (S1915). Then, the server may identify the at least one object included in the image based on the received image (S1920). When the at least one object included in the image is identified, the server may transmit information on the at least one object to the electronic device 100 (S1925).

Meanwhile, the electronic device 100 may receive the user voice (S1930). When the user voice is received, the electronic device 100 may transmit the received user voice to the server (S1935). The server may obtain text information corresponding to the user voice based on the received user voice (S1940). Then, when the text information corresponding to the user voice is obtained, the server may transmit the text information corresponding to the user voice to the electronic device 100 (S1945).

Meanwhile, the electronic device 100 may identify the object corresponding to the received user voice from among the at least one object included in the image (S1950). The object corresponding to the user voice may be identified based on at least one from among the text information corresponding to the user voice and the received touch interaction of the user Then, when the object corresponding to the user voice is identified, the electronic device 100 may display the memo UI including text information on the area corresponding to the object identified as corresponding to the user voice from among the areas on the display (S1955).

Meanwhile, in the above, the process of object recognition and voice recognition being performed entirely through one server has been described, but the process of object recognition and voice recognition according to the disclosure may also be performed through a plurality of servers capable of performing each process.

According to the various embodiments of the disclosure as described above with reference to FIGS. 1 to 19, according to the various embodiments of the disclosure as described above, the electronic device 100 may display the memo UI on the area desired by the user based on only the text information corresponding to the user voice without a separate user manipulation of designating an area for the memo UI including text information to be displayed on the display.

In addition, the electronic device 100 may specify the user voice which is the subject of voice recognition based on the touch interaction of the user while concurrently determine the area to which the memo UI is to be displayed, and display the memo UI.

Accordingly, the user of the electronic device 100 may generate text information corresponding to the user voice through the user interface using an intuitive and convenient method, and display the generated text information in an area on the display corresponding to the user intent.

Meanwhile, the control method of the electronic device 100 as described above, the control process of the processor and the various embodiments according thereto may be implemented as a program and provided to the electronic device 100. Specifically, the program which includes the control method of the electronic device 100 may be stored in a non-transitory computer readable medium and provided.

Here, the non-transitory computer readable medium may refer to a medium that stores data semi-permanently rather than storing data for a very short time, such as a register, a cache, a memory, or the like, and is readable by a device. Specifically, the various applications or programs described above may be stored in the non-transitory computer readable medium, such as, for example, and without limitation, a CD, a DVD, a hard disc, a Blu-ray disc, a USB, a memory card, a ROM, and the like and provided.

Meanwhile, at least one from among the plurality of modules are described above may be implemented through the artificial intelligence model. The function related to the artificial intelligence according to the disclosure may be performed through the memory and the processor.

The processor may be included of one or a plurality of processors. At this time, the one or plurality of processors may be a generic use processor such as a CPU, an AP, or the like, a graphics dedicated processor such as a GPU, a VPU, or the like, or an artificial intelligence dedicated processor such as an NPU.

The one or plurality of processors may be configured to control for the input data to be processed according to a pre-defined operation rule or an artificial intelligence model stored in the non-volatile memory and the volatile memory. The pre-defined operation rule or the artificial intelligence model is characterized by being generated through learning.

Here, being generated through learning may refer to a pre-defined operation rule or an artificial intelligence model being created of a desired characteristic by applying a learning algorithm to the multiple learning data. This learning may be carried out in the device itself in which the artificial intelligence according to the disclosure is performed or carried out through a separate server/system.

The artificial intelligence model may be included of a plurality of neural network layers. Each layer may include a plurality of weight values, and may perform processing of the layer through the processing results of a previous layer and the processing of the plurality of weight values. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Networks (GAN), and a Deep-Q Networks, but the neural network in the disclosure is not limited to the above-described examples unless otherwise specified.

The learning algorithm is a method of training a predetermined subject device (e.g., robot) by using multiple learning data so that the predetermined subject device is able to self-determine or predict. Examples of the learning algorithm may include supervised learning, unsupervised learning, semi-supervised learning, or reinforcement learning, and the learning algorithm of the disclosure is not limited to the above-described example unless otherwise specified.

While the disclosure has been shown and described with reference to the exemplary embodiments thereof, the disclosure is not limited to the embodiments specifically described and various modifications may be made therein by those skilled in the art to which this disclosure pertains without departing from the spirit and scope of the disclosure, and such modifications shall not be understood as separate from the technical concept or outlook of the present disclosure.

What is claimed is:
1. An electronic device, comprising:
a display;
a microphone;
a memory configured to store at least one instruction; and
a processor configured to execute the at least one instruction, wherein the processor is configured to:
  obtain, based on a user voice being received through the microphone, text information corresponding to the user voice by performing voice recognition on the user voice, and
  based on a touch interaction being received on the display while the user voice is being received:
    identify a first area of the display in which the touch interaction is received, and
    control the display to display, on the identified first area, a memo user interface (UI) including the text information.

2. The electronic device of claim 1, wherein the processor is configured to:
  identify, based on an image including at least one object being obtained, at least one object included in the image by analyzing the image;
  based on the touch interaction not being received on the display while the user voice is being received, identify whether an object among the at least one object included in the image is corresponds to the text information, and
  based on the object corresponding to the text information being identified:
    identify a second area of the display corresponding to the identified object, and
    control the display to display, on the identified second area, the memo UI including the text information.

3. The electronic device of claim 2, wherein the processor is configured to identify, based on information regarding the at least one object included in the image corresponding to the obtained text information, an object corresponding to the information regarding the at least one object from among the at least one object as the object corresponding to the text information.

4. The electronic device of claim 1, wherein the processor is configured to:
  perform voice recognition on a user voice which is received while the touch interaction is being maintained on the display from among the user voice received through the microphone, and
  obtain text information corresponding to the user voice for which the voice recognition is performed.

5. The electronic device of claim 1, wherein the processor is configured to:
  determine at least one from among a size and form of the memo UI based on a coordinate value of the touch interaction of a user received on the display, and
  control the display to display, on the identified first area, the memo UI based on at least one from among the determined size and form.

6. The electronic device of claim 2, wherein the processor is configured to:
  control, based on there being two or more objects identified as corresponding to the text information, the display to display a selecting UI including information on two or more objects on the display, and
  identify, based on a user input selecting one object from among two or more objects being received through the selecting UI, the selected one object as the object corresponding to the text information.

7. The electronic device of claim 1, wherein the processor is configured to:
  obtain, based on a pronoun being included in the obtained text information, text information in which the pronoun is changed to a name of the identified object, and
  control the display to display, on the identified first area, a memo UI including the changed text information.

8. The electronic device of claim 1, further comprising:
a communicator comprising circuitry,
  wherein the processor is configured to control, based on a name of a pre-stored user being included in the obtained text information, the communicator to transmit the obtained text information to a user terminal corresponding to the name of the pre-stored user.

9. A control method of an electronic device comprising a display, the method comprising:
  obtaining, based on a user voice being received, text information corresponding to the user voice by performing voice recognition on the user voice, and
  based on a touch interaction being received on the display while the user voice is being received,
    identifying a first area of the display in which the touch interaction is received, and
    displaying, on the identified first area, a memo user interface (UI) including the text information.

10. The control method of claim 9, further comprising:
  identifying, based on an image including at least one object being obtained, at least one object included in the image by analyzing the image,
  based on the touch interaction not being received on the display while the user voice is being received, identifying whether an object among the at least one object included in the image corresponds to the text information, and
  based on the object corresponding to the text information being identified:
    identifying a second area of the display corresponding to the identified object, and
    displaying, on the identified second area, the memo UI including the text information.

11. The control method of claim 10, further comprising:
  identifying, based on information regarding the at least one object included in the image corresponding to the obtained text information, an object corresponding to the information regarding the at least one object from among the at least one object as the object corresponding to the text information.

12. The electronic device of claim 9, further comprising:
  performing voice recognition on a user voice which is received while the touch interaction is being maintained on the display from among the user voice received, and
  obtaining text information corresponding to the user voice for which the voice recognition is performed.

13. The electronic device of claim 9, further comprising:
  determining at least one from among a size and form of the memo UI based on a coordinate value of the touch interaction of a user received on the display, and
  displaying, on the identified first area, the memo UI based on at least one from among the determined size and form.

14. The electronic device of claim 10, further comprising:
  displaying, based on there being two or more objects identified as corresponding to the text information, a selecting UI including information on two or more objects on the display, and
  identifying, based on a user input selecting one object from among two or more objects being received through the selecting UI, the selected one object as the object corresponding to the text information.

15. The electronic device of claim 9, further comprising:
  obtaining, based on a pronoun being included in the obtained text information, text information in which the pronoun is changed to a name of the identified object, and displaying, on the identified first area, a memo UI including the changed text information.

16. The electronic device of claim 9, further comprising:
transmitting, based on a name of a pre-stored user being included in the obtained text information, the obtained text information to a user terminal corresponding to the user name of the pre-stored user.

17. An electronic device, comprising:
a display;
a microphone;
a memory configured to store at least one instruction; and
a processor configured to execute the at least one instruction,
wherein the processor is configured to:
identify, based on an image including at least one object being obtained, at least one object included in the image by analyzing the image,
obtain, based on a user voice being received through the microphone, text information corresponding to the user voice by performing voice recognition on the user voice,
based on a touch interaction not being received on the display while the user voice is being received, identify whether an object among the at least one object included in the image corresponds to the text information, and
based on the object corresponding to the text information being identified:
identify a first area of the display corresponding to the identified object, and
control the display to display, on the identified first area, a memo user interface (UI) including the text information.

* * * * *